US012528734B2

(12) United States Patent
Davis, Jr. et al.

(10) Patent No.: US 12,528,734 B2
(45) Date of Patent: *Jan. 20, 2026

(54) COATED GLASS-BASED ASSEMBLY

(71) Applicant: CORNING INCORPORATED, Corning, NY (US)

(72) Inventors: Ronald William Davis, Jr., Corning, NY (US); John Philip Finkeldey, Elkland, PA (US); Lawrence Vincent Daniel Gammond, Painted Post, NY (US); Timothy Michael Gross, Painted Post, NY (US); Jason Thomas Harris, Horseheads, NY (US); Shandon Dee Hart, Elmira, NY (US); Erin Katherine Hosmer, Canisteo, NY (US); John Tyler Keech, Santa Barbara, CA (US); Alexandra Lai Ching Kao Andrews Mitchell, Ithaca, NY (US); Aniello Mario Palumbo, Painted Post, NY (US); Naveen Prakash, Fishers, IN (US); James Joseph Price, Corning, NY (US); Ross Johnson Stewart, Corning, NY (US); Nicholas Michael Walker, Painted Post, NY (US); Wendell Porter Weeks, Jr., Rochester, NY (US); Jingshi Wu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/990,217

(22) Filed: Dec. 20, 2024

(65) Prior Publication Data
US 2025/0122117 A1    Apr. 17, 2025

Related U.S. Application Data

(63) Continuation-in-part of application No. 18/677,404, filed on May 29, 2024, now Pat. No. 12,234,175, and
(Continued)

(51) Int. Cl.
C03C 17/34     (2006.01)
C03C 3/062     (2006.01)

(52) U.S. Cl.
CPC .......... C03C 17/3435 (2013.01); C03C 3/062 (2013.01); C03C 2203/10 (2013.01);
(Continued)

(58) Field of Classification Search
CPC .............. C03C 17/22–27; C03C 17/34; C03C 17/3411–3494; C03C 2217/734;
(Continued)

(56) References Cited

U.S. PATENT DOCUMENTS 3,411,934 A    11/1968    Englehart et al.
5,162,136 A    11/1992    Blum et al.
(Continued)

FOREIGN PATENT DOCUMENTS

CN    207345192 U    5/2018
CN    103328398 B    9/2018
(Continued)

OTHER PUBLICATIONS

Lecture slides from Virtual Course on Glass, lecture 12. https://www.lehigh.edu/imi/teched/GlassProp/Slides/GlassProp_Lecture12_Mecholsky.pdf.*
(Continued)

Primary Examiner — Z. Jim Yang
(74) Attorney, Agent, or Firm — Russell S. Magaziner

(57) ABSTRACT

A glass-based assembly includes a glass or glass-ceramic substrate comprising a surface. The surface has flaws, such
(Continued)

as a population of small cracks extending into the surface, whereby the substrate is weakened relative to ideal strength thereof. The assembly further includes a coating coupled to the substrate and overlaying at least some of the flaws. Ultimate strength of the substrate with the coating coupled thereto is greater than that of the substrate alone, without the coating.

20 Claims, 20 Drawing Sheets

Related U.S. Application Data a continuation-in-part of application No. PCT/US2024/031357, filed on May 29, 2024, and a continuation-in-part of application No. 18/238,179, filed on Aug. 25, 2023, now Pat. No. 12,202,764, said application No. PCT/US2024/031357 is a continuation-in-part of application No. 18/238,179, filed on Aug. 25, 2023, now Pat. No. 12,202,764.

(60) Provisional application No. 63/725,934, filed on Nov. 27, 2024, provisional application No. 63/681,448, filed on Aug. 9, 2024, provisional application No. 63/634,535, filed on Apr. 16, 2024, provisional application No. 63/633,265, filed on Apr. 12, 2024, provisional application No. 63/575,885, filed on Apr. 8, 2024, provisional application No. 63/575,880, filed on Apr. 8, 2024, provisional application No. 63/526,550, filed on Jul. 13, 2023, provisional application No. 63/470,498, filed on Jun. 2, 2023.

(52) U.S. Cl.
CPC .. $C03C\ 2217/213$ (2013.01); $C03C\ 2217/218$ (2013.01); $C03C\ 2217/281$ (2013.01); $C03C\ 2217/734$ (2013.01); $C03C\ 2217/78$ (2013.01)

(58) Field of Classification Search
CPC ............ C03C 2217/77; C03C 2217/78; C03C 2217/21–244; C03C 2217/28–289
See application file for complete search history.

(56) References Cited

U.S. PATENT DOCUMENTS

| | | | |
|---|---|---|---|
| 5,476,692 A | 12/1995 | Ellis et al. | |
| 6,013,333 A | 1/2000 | Carson et al. | |
| 6,120,908 A | 9/2000 | Papanu et al. | |
| 6,696,157 B1 | 2/2004 | David et al. | |
| 7,317,053 B1 | 1/2008 | Gelman et al. | |
| 8,778,496 B2 | 7/2014 | Hart | |
| 8,814,691 B2 | 8/2014 | Haddick et al. | |
| 9,435,915 B1 | 9/2016 | Lower et al. | |
| 10,436,945 B2 | 10/2019 | Hart et al. | |
| 11,072,558 B2 | 7/2021 | Baloukas et al. | |
| 11,242,280 B2 | 2/2022 | Hart et al. | |
| 11,407,681 B2 | 8/2022 | Bellman et al. | |
| 11,461,936 B2 | 10/2022 | Freeman et al. | |
| 2003/0077453 A1 | 4/2003 | Oaku et al. | |
| 2004/0071960 A1 | 4/2004 | Weber et al. | |
| 2008/0199618 A1* | 8/2008 | Wen | C03C 17/30 522/182 |
| 2010/0255225 A1 | 10/2010 | Cording et al. | |
| 2012/0134025 A1 | 5/2012 | Hart | |
| 2013/0127202 A1* | 5/2013 | Hart | C03C 17/3417 428/428 |
| 2014/0001181 A1 | 1/2014 | Sharma et al. | |
| 2014/0078589 A1 | 3/2014 | Fujii et al. | |
| 2014/0090864 A1 | 4/2014 | Paulson | |
| 2014/0146394 A1 | 5/2014 | Tout et al. | |
| 2014/0151370 A1 | 6/2014 | Chang et al. | |
| 2015/0037554 A1 | 2/2015 | Gao et al. | |
| 2015/0376443 A1 | 12/2015 | Chou et al. | |
| 2016/0060161 A1* | 3/2016 | Ellison | C03C 3/085 427/419.7 |
| 2016/0207825 A1 | 7/2016 | Black et al. | |
| 2016/0324016 A1 | 11/2016 | Bellman et al. | |
| 2017/0183255 A1 | 6/2017 | Walther et al. | |
| 2018/0162771 A1* | 6/2018 | Fujii | C03C 3/085 |
| 2018/0315953 A1 | 11/2018 | Hu et al. | |
| 2018/0339938 A1* | 11/2018 | Bellman | C04B 41/5025 |
| 2018/0354846 A1 | 12/2018 | Koep et al. | |
| 2018/0362396 A1* | 12/2018 | Rogers | C03C 17/3636 |
| 2019/0225538 A1* | 7/2019 | Harris | C03C 17/23 |
| 2019/0337841 A1* | 11/2019 | Hart | C23C 14/10 |
| 2019/0352226 A1* | 11/2019 | Harris | C03C 17/225 |
| 2019/0377386 A1* | 12/2019 | Heo | G06F 1/1652 |
| 2020/0044170 A1 | 2/2020 | Seki et al. | |
| 2020/0097044 A1 | 3/2020 | Kim et al. | |
| 2020/0103559 A1 | 4/2020 | Fujii et al. | |
| 2020/0156992 A1 | 5/2020 | Baloukas et al. | |
| 2020/0165162 A1 | 5/2020 | Bellman et al. | |
| 2020/0247715 A1 | 8/2020 | Adib et al. | |
| 2020/0262746 A1* | 8/2020 | He | B32B 27/34 |
| 2020/0346973 A1* | 11/2020 | Akao | G02B 1/14 |
| 2020/0399171 A1* | 12/2020 | Ahmed | C03C 3/093 |
| 2020/0410208 A1 | 12/2020 | Thothadri et al. | |
| 2021/0087105 A1* | 3/2021 | Bellman | C03C 17/42 |
| 2021/0096280 A1* | 4/2021 | Kim | G02B 1/14 |
| 2021/0149090 A1 | 5/2021 | Nattermann et al. | |
| 2021/0179479 A1 | 6/2021 | Amma et al. | |
| 2021/0300625 A1 | 9/2021 | Henry et al. | |
| 2021/0333437 A1 | 10/2021 | Cangemi et al. | |
| 2022/0251396 A1 | 8/2022 | Amin et al. | |
| 2022/0267198 A1* | 8/2022 | Bu | C08F 222/103 |
| 2022/0268967 A1* | 8/2022 | Melcher | C03C 21/002 |
| 2023/0043558 A1 | 2/2023 | Fadeev et al. | |
| 2023/0166481 A1 | 6/2023 | Boromand et al. | |
| 2024/0327272 A1* | 10/2024 | Mangold | C03C 17/04 |
| 2025/0019296 A1* | 1/2025 | Yoldas | C08G 77/58 |

FOREIGN PATENT DOCUMENTS

| | | |
|---|---|---|
| CN | 208454827 U | 2/2019 |
| CN | 113500838 B | 11/2022 |
| EP | 3161081 B1 | 1/2019 |
| EP | 4008695 A1 | 6/2022 |
| GB | 1088557 A | 10/1967 |
| JP | 3019172 B2 | 3/2000 |
| JP | 5740388 B2 | 6/2015 |
| KR | 10-1654808 B1 | 9/2016 |
| WO | 89/10903 A1 | 11/1989 |
| WO | 2002/004133 A3 | 5/2002 |
| WO | 2013/078039 A1 | 5/2013 |
| WO | 2014/035942 A1 | 3/2014 |
| WO | 2016/033138 A1 | 3/2016 |
| WO | 2018/227192 A1 | 12/2018 |
| WO | 2021/030098 A1 | 2/2021 |
| WO | 2022/126076 A1 | 6/2022 |

OTHER PUBLICATIONS

Glass Fundamentals 1B, the Strength of Glass, Saint Gobain Building Glass UK, 2018.*
Springer Handbook of Glass, ISBN 978-3-319-93726-7, 2019, sect. 7.3.2, https://doi.org/10.1007/978-3-319-93728-1.*
Wen et al., "Edge-strengthening of flat glass with acrylate coatings", Journal of Non-Crystalline Solids, vol. 354, 2008, 5060-5067; 10.1016/j.jnoncrysol.2008.08.004.*
Dutta, I and Zhang, J (both staff scientists at Corning), "Fundamentals of Glass Technology & Applications for Advanced Semiconductor Packaging", 2019 IEEE 69th ECTC, pp. 1, 2, and 68-74.*
Hall, M (Technical Affairs Director at Corning), Pharma glass properties—Part 6. Strength, https://www.linkedin.com/pulse/pharma-glass-properties-part-6-strength-matthew-hall-fztee/.*
Disclosure by Applicant re: sale of coated glass submitted to USPTO Aug. 15, 2024, 1 page.

(56) References Cited

OTHER PUBLICATIONS

International Search Report and Written Opinion of the International Searching Authority; PCT/US2024/031357; dated Sep. 24, 2024; 9 pages; European Patent Office.

* cited by examiner

COATED GLASS-BASED ASSEMBLY

CROSS-REFERENCE TO RELATED APPLICATIONS

This Application is a continuation-in-part of U.S. application Ser. No. 18/238,179 filed on Aug. 25, 2023, which claims the priority benefit of U.S. Application No. 63/526,550 filed Jul. 13, 2023 and claims the priority benefit of U.S. Application No. 63/470,498 filed on Jun. 2, 2023; this Application is a continuation-in-part of International Application No. PCT/US2024/031357 filed on May 29, 2024, which is a continuation-in-part of U.S. application Ser. No. 18/238,179 filed on Aug. 25, 2023, which claims the priority benefit of U.S. Application Nos. 63/526,550 filed on Jul. 13, 2023 and 63/470,498 filed on Jun. 2, 2023; this Application is a continuation-in-part of U.S. application Ser. No. 18/677,404 filed May 29, 2024, which claims the priority benefit of U.S. Application No. 63/634,535, filed on Apr. 16, 2024; this Application claims the priority benefit of U.S. Application No. 63/725,934 filed on Nov. 27, 2024; this Application claims the priority benefit of U.S. Application No. 63/634,535 filed Apr. 16, 2024; this Application claims the priority benefit of U.S. Application No. 63/575,885 filed on Apr. 8, 2024; this Application claims the priority benefit of U.S. Application No. 63/575,880 filed on Apr. 8, 2024; this Application claims the priority benefit of U.S. Application No. 63/633,265 filed on Apr. 12, 2024; and this Application claims the priority benefit of U.S. Application No. 63/681,448 filed on Aug. 9, 2024, and each of the above applications is hereby incorporated by reference herein in its entirety.

BACKGROUND

Aspects of the present disclosure relate to coatings and glass-based assemblies, and in some aspects to coated glass articles, such as containers, windows, glass covers (e.g., of constant or variable thickness), substrates, glass housings, waveguides, and other articles.

Some glasses may be wire-saw cut from boules into wafers or otherwise formed in ways that leave the glasses with rough surfaces, which may then be lapped and polished to remove stress concentrations or crack nucleation sites. Then, finely polishing such glasses may provide a high quality surface, which may be important, especially for glasses with a high propensity to crack, where cracks may propagate from small surface flaws. However, fine polishing can be an expensive and slow process, and may also rely on use of acid-based etchants. Furthermore this process may not improve strength of fragile glasses enough for subsequent handling or processing.

Still other glasses, such as cover glasses for electronic displays or interfaces, may be exposed to repeated and/or rough contact by users or in operation. Such glasses may fail due to cracking, especially when so handled.

A need exists for sufficiently or alternatively strengthening glasses.

SUMMARY

While experimenting with different anti-reflective coatings for brittle high-index glass, Applicants discovered as surprising synergy. Applicants' particular use of very thin coatings, not even intended to influence strength of the underlying glass substrate, unexpectedly increased the strength of that substrate substantially. Furthermore, the strengthening result Applicants discovered did not just strengthen the glass proportional to a super-position strength contribution of the small amount of coating on the brittle high-index glass. Instead, the anti-reflective coating strengthened the high-index glass significantly, such as by 10s or even 100s of megapascals in ultimate strength (e.g., ultimate tensile strength), as discussed below and shown in FIG. 2 for example.

This strengthening result for the coated glass was surprising because hard, scratch-resistant coatings on glasses may do the opposite-while preventing scratching, such hard coatings may actually weaken the combined assembly of a glass substrate with a coating layer. Since making the above discovery, Applicants have worked to better understand and utilize the glass strengthening technology. Applicants believe the unexpected, synergistic strengthening effect may result from a combination of phenomena beneficial to strength of the corresponding glass-based assembly. Further the strengthening may result from mechanical behavior of the glass and coating together, largely independent of specific glass or coating compositions.

First, Applicants theorize the coating layer, with mechanical attributes disclosed herein (e.g., elasticity, ultimate strength, bonding, geometry, consistency of the coating), constrains open ends of very small cracks nucleated at a surface of the underlying glass substrate. Without the coating layer, such cracks may otherwise more freely propagate inward from the surface as the glass substrate is stressed.

Second, the coating, if arranged to seal the surface of the glass substrate underlying the coating, may block water vapor or other elements carried by air from reaching crack tips, and thereby locally changing chemistry of the glass at the crack tips. Without the coating layer and without corresponding blocking of water vapor, Applicants believe that oxidation of the crack tips in some glasses for example may otherwise hasten crack growth.

Third, by selecting a coating with the mechanical attributes disclosed herein, the coating of the coating layer does not fail in cracking before the glass of the underlying glass substrate. Were the opposite the case, that the coating fails first when strained, Applicants theorize cracks in the coating may otherwise focus stresses at contact points corresponding to the crack reaching the interface of the coating layer and the glass substrate. With the coating selected and designed to not fail before the glass, such stress concentrations are avoided.

Fourth, the interface of the coating layer and the glass substrate may be carefully cleaned or otherwise made to have few if any third body debris (e.g., polishing agent, grease), which may otherwise locally decouple the coating layer and the glass substrate. Put another way, the glass substrate is carefully prepared to receive the coating so that the coating is evenly adhered to the substrate, reducing chances of inadvertent delamination of the coating.

Lastly, the coating layer is applied carefully and consistently on the surface of the glass substate, without internal inconsistency of the coating or local damage to the coating layer, as may be caused by poor handling or inadvertent contact with tooling for example (cf. "Outliers" in FIG. 7 and corresponding text herein).

Applicants believe that a combination of the above phenomena and mechanical attributes of the glass and coating, in combination with those disclosed below and elsewhere herein, help the above-described glass-based assembly to achieve the substantial strength improvement. With that said, other phenomena may contribute to or achieve the observed result as further discussed herein.

Additional features and advantages are set forth in the detailed description that follows, and in part will be readily apparent to those skilled in the art from the description or recognized by practicing the technology as described in the written description and claims hereof, as well as the appended drawings. It is to be understood that both the foregoing general description and the following detailed description are merely exemplary and are intended to provide an overview or framework to understand the nature and character of the claims.

BRIEF DESCRIPTION OF THE FIGURES

The accompanying figures are included to provide a further understanding and are incorporated in and constitute a part of this specification. The drawings of the figures illustrate one or more aspects of the present disclosure, and together with the detailed description explain principles and operations of the various aspects. As such, the disclosure will become more fully understood from the following detailed description, taken in conjunction with the accompanying figures, in which.

DETAILED DESCRIPTION

Before turning to the following detailed description and figures, which illustrate aspects of the present disclosure in detail, it should be understood that the present inventive technology is not limited to the details or methodology set forth in the detailed description or illustrated in the figures. For example, as will be understood by those of ordinary skill in the art, features and attributes associated with an aspect shown in one of the figures or described in the text relating to an aspect may be applied to another aspect shown in another of the figures or described elsewhere in the text.

Figure 1:
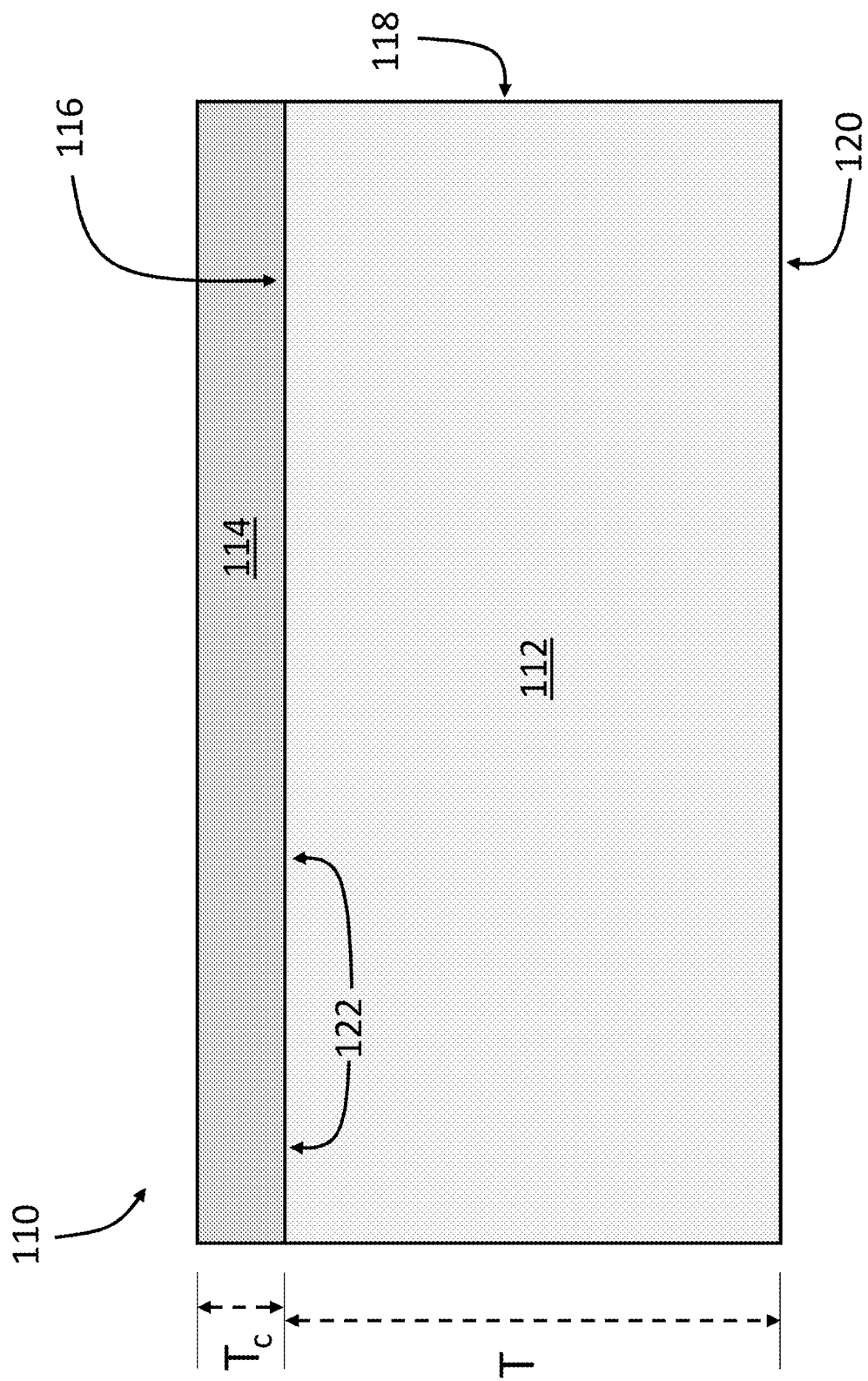
FIG. 1 is a schematic view of a conceptual glass-based assembly according to an aspect of the present disclosure.

Referring to FIG. 1, a glass-based assembly 110 includes a glass substrate 112 and a coating layer 114 overlaying (e.g., extending over, blanketing) and laminated to the glass substrate 112 (shown from the side in FIG. 1). As used herein, "substrate" refers to a body upon which a coating may be applied, such as a sheet, a bowl, a sphere, a tube, a window, or other articles. More specifically, the glass-based assembly 110 is in the form of a generic coated sheet or wafer of glass, but many forms of glass-based assemblies are contemplated, such as coated windows, panels, tubes, containers, spheres, and fibers for example. Further, while glass of the glass substrate 112 may be amorphous, Applicants contemplate glass-ceramic glass substrates may benefit from coatings as disclosed herein, or even ceramic substrates may so benefit, such as lithium garnet solid electrolyte sheets for example, as an aspect of the present disclosure.

The glass-based assembly 110 may consist of the glass substrate 112 and the coating layer 114, or consist essentially of the glass substrate 112 and the coating layer 114, such as if the glass-based assembly 110 includes an adhesion promoter therebetween. However, such a glass-based assembly 110 may then be integrated in other devices and assemblies, such as glasses, optical equipment, windows, displays, containers, architectural panels, etc. With that said, Applicants contemplate that the glass-based assembly 110 may comprise the glass substrate 112 and coating layer 114, and the glass-based assembly 110 may also include other elements, such as decorative paint, conductive vias, etc. according to an aspect of the present disclosure.

While the glass-based assembly 110 includes the coating layer 114 on a first major surface 116, and not on edges 118 or a second major surface 120 of the glass substrate 112, the present disclosure is not so limited. According to aspect, first and second major surfaces 116, 120 may be overlaid with coating layers (e.g., coating layer 114) and/or edges 118 may be so coated. Applicants contemplate coatings as disclosed herein may also be sandwiched between glass, such as in a laminated glass assembly (e.g., windshield, sunroof, windows, laminated glass panels; see, e.g., glass-based assembly 810 of FIG. 8), where an interior layer of the laminate and/or exterior coating layers have attributes as disclosed herein. Coatings between glass in a laminate may be different in composition, geometry, etc. than coatings on exterior surfaces of such assemblies.

As indicated above, according to an aspect of the present disclosure, the coating layer 114 is overlaying the glass substrate 112. The coating layer 114 may be mostly (>50% in terms of area) overlaying the glass substrate 112, such as >80% in terms of area, such as covering >90% of area of a major surface 116, 120 of the glass substrate 112, >99% of the area, or even fully overlaying the glass substrate 112, or just a side thereof, such as so overlaying the first major surface 116 (as shown in FIG. 1), the second major surface 120, and/or the edges 118. The overlaying may include direct contact between the coating layer 114 and glass substrate 112, or may include an intermediate material, such as an adhesion promoter (e.g., 3M Adhesion Promotor 111, Loctite Primer SF 7471, Dow Corning Primer P5201) sandwiched between the coating layer 114 and the glass substrate 112, for example. The major surface(s) 116, 120, and/or edges 118 may be treated (e.g., ion-exchanged, oxidized, protonated by acid, etc.) to better bond the coating layer 114 or for other purposes (e.g., further strengthening, aesthetics).

According to an aspect of the present disclosure, glass of the glass substrate 112 (i.e. independent of the coating layer 114; e.g. amorphous glass, glass-ceramic) has elasticity, where the glass may be stressed, correspondingly deform (e.g. stretch), and then generally return to an original geometry once the stress is released. Applicants acknowledge that the glass may not be perfectly elastic and that there may be hysteresis or some relatively small amount of plastic deformation, which may become more apparent for example if stresses are cyclical, potentially leading to fatigue effects.

While the glass of the glass substrate 112 has elasticity, if the glass of the glass substrate 112 is stretched (i.e. strained) enough, then the glass will break at "fracture strain" (also called "strain to failure," "failure strain," "maximum strain"). Fracture strain of the glass, as used herein, refers to strain at failure for a statistically significant population of representative samples, with a default where the strain at failure is the "average strain," where 50% of the population fails at strains greater than the average strain, and 50% lesser (but alternatively other percentages may be claimed as supported by the present disclosure, such as the B10 strain of the population at failure). Other disclosure herein relates to the "B10 strain," where 90% of the population fails at strains greater than the B10 strain. The population should be statistically significant, such as default of 30 samples unless otherwise specified, such as if population of 100 samples, 200 samples, 500 samples, etc. is specified in claims hereof for greater confidence, or such as 20 samples or 15 samples if less confidence is required. Clearly in addition to composition, the population of samples should have similar surface finish/roughness (e.g. default of Ra<1 nm, as discussed below) to that of the glass substrate.

According to an aspect of the present disclosure, the coating of the coating layer 114 is a coating that has fracture strain greater than that of the glass of the glass substrate 112. Stretching of the coating of the coating layer 114 to the fracture strain of the glass of the glass substrate 112 does not fracture the coating, such as on average for a statistically significant population as described above. As such, all things being equal, when increasingly strained, such as via a ring-on-ring test (see ASTM C1499), the coating layer 114 holds together and does not crack or fracture prior to failure of the glass substrate 112. By contrast, coatings with a fracture strain less than that of the glass substrate 112, especially those substantially less, may crack well before the glass of the glass substrate 112 would crack, and cracks in the coating may weaken underlying glass by providing sites for stress concentrations at the coating-to-glass interface 122, where a crack passing through the coating layer 114 reaches the glass substrate 112.

According to an aspect of the present disclosure, the coating layer 114 is laminated to the glass substrate 112, meaning that the coating layer 114 is coupled to, such as physically bonded to or adhered to the glass substrate 112, which may again include an intermediate adhesion promoter or adhesive for example. According to an aspect, the lamination may be consistent across a full interface 122 between the glass substrate 112 the coating layer 114, meaning that there are not delaminated areas or patches of the glass substrate 112 overlaid by the coating layer 114. According to an aspect of the present disclosure, bonding is such that when stretched to the fracture strain of the glass of the glass substrate 112, the coating layer 114 does not delaminate from the glass substrate 112, such as on average in a statistically significant population as described above. Instead, the coating layer 114 remains fully attached to the glass substrate 112, as just described.

Although not drawn to scale, according to an aspect of the present disclosure, the glass substrate 112 has a thickness T, defined as a distance orthogonal to the first major surface 116 and through a body of the glass substrate 112, between the first major surface 116 and the second major surface 120. While the thickness T is constant horizontally across the glass-based assembly 110 in FIG. 1, glass-based assemblies may have variable thicknesses, such as for optical or medical equipment (e.g., optical lens curved to direct light;

thicker corners or neck of medicinal container), where the value of thickness T is present among other thicknesses.

Figure 2:
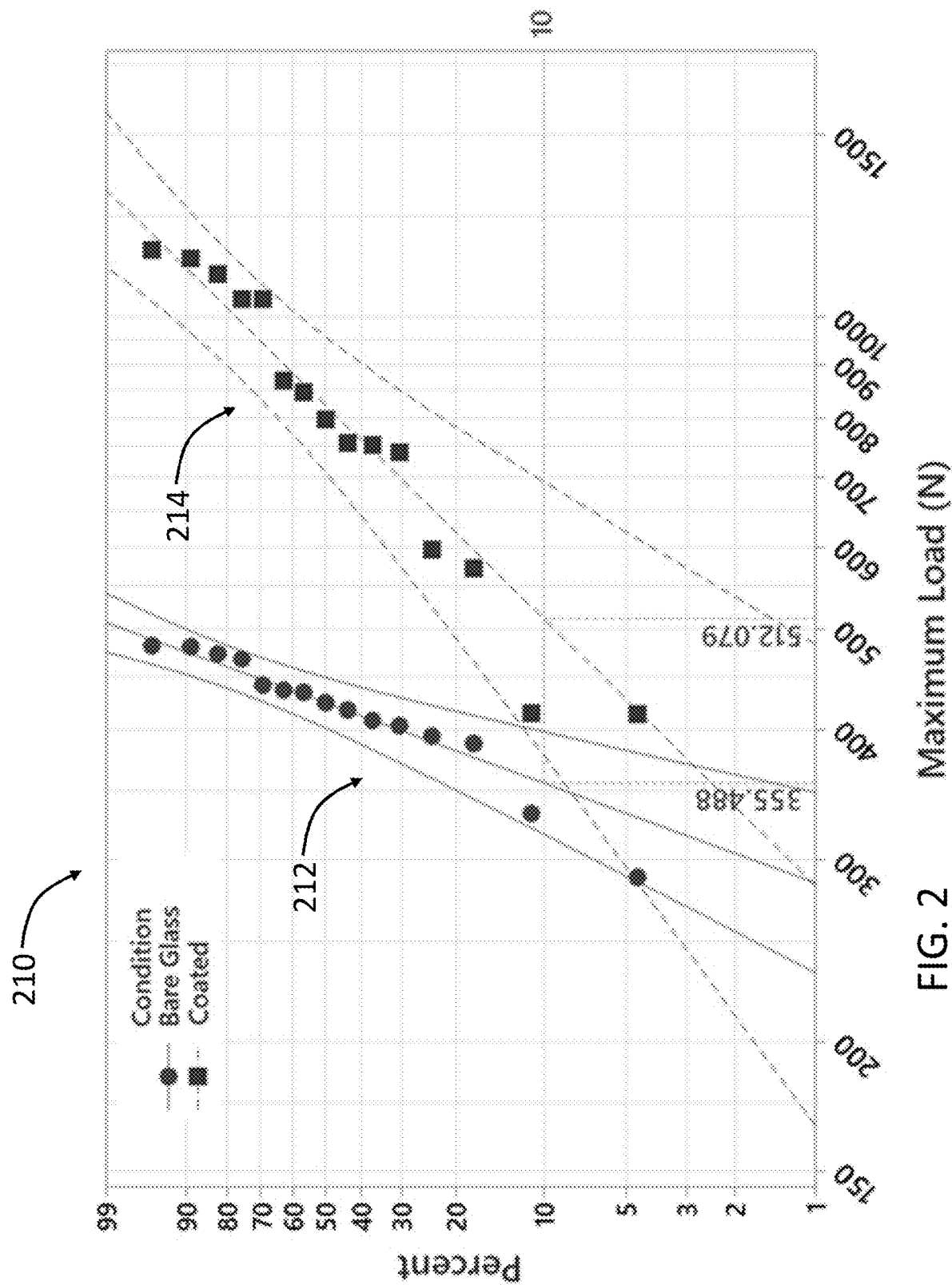
FIG. 2 is a Weibull plot of maximum load (N), or load at fracture, of bare and coated glass substrates according to an aspect of the present disclosure.

As indicated in the Summary above, Applicants were initially surprised to find a coating layer improving strength of a glass substrate (see generally coating layer 114 and glass substrate 112 of glass-based assembly 110 of FIG. 1), but investigated further. Referring now to FIG. 2, a plot 210 presents probability in percentage of maximum load (i.e. x-axis; aka load at failure), in terms of newtons, for a ring-on-ring test as indicated above (see ASTM C1499). Notably, a 30 mm diameter support ring and a 15 mm diameter loading ring were used to fracture circular wafers of glass with and without coating on a top side of the wafer. The maximum load in the plot 210 is the load at which the rings were pressed together when the glass wafer (bare 212 or coated 214) therebetween failed.

The plot 210 of FIG. 2 is more specifically a Weibull plot corresponding to a 95% confidence interval. Glass wafers resulting in the data of FIG. 2 were 300 mm in diameter and 0.6 mm in thickness T (see FIG. 1), had a modulus of elasticity of 116 GPa (for at least a portion of their stress-strain response) without coating, and the coating itself had a modulus of 80 GPa and coating thickness $T_C$ (see FIG. 1) of about ⅔μm in total. Also the glass wafers were a brittle high-index glass (specifically in terms of oxide constituents, 33 mol % $B_2O_3$, 20 mol % $La_2O_3$, 15 mol % $Nb_2O_5$, 9 mol % $TiO_2$, 7 mol % $ZrO_2$, and 16 mol % $WO_3$) and the coating was 13 alternating sub-layers of oxides of tantalum and silicon (e.g., $Ta_2O_5$, $SiO_2$) applied by evaporative coating, designed to reduce reflection of light upon the underlying surface of the glass substrate (see generally major surface 116 as shown in FIG. 1).

Although benefits disclosed herein may stem from mechanical interactions and behaviors of the glass substrate 112 and coating layer 114; non-silicate glasses (e.g., phosphate glasses, chalcogenide glasses, borate glasses) may particularly benefit from the technology disclosed herein. Just to clarify, "phosphate" glasses are those where the primary glass forming oxide is $P_2O_5$, such as instead of silica for silicate glasses. "Chalcogenides" are glasses containing sulfur, selenium, or tellurium (e.g., sulfur-based). $SO_2$ (+$SO_3$) may be a major constituent—such as greater than 2 mol %, 5 mol %, 8 mol %, 10 mol % for example, as opposed to simply being included for fining. The example glass used in FIG. 2 specified above is accordingly a borate glass with boria as the primary glass forming oxide. According to an aspect of the present disclosure, the glass has less than 20 mol % silica as a constituent thereof, such as less than 0.5 mol % silica. According to an aspect of the present disclosure, the glass has an oxide constituent with greater mol % than that of silica. According to an aspect, the glass comprises less than 40 mol % silica as a constituent thereof, such as less than 30 mol % silica, such as less than 10 mol % silica, 5 mol % silica, 2 mol % silica, or even 1 mol % silica for some such glasses. Such glasses may be more brittle and/or less tough than other glasses, such as silicates or aluminosilicates for example.

According to an aspect of the present disclosure, glass of the glass substrate 112 is brittle, having a fracture toughness less than 0.9 MPa·m$^{1/2}$, such as less than 0.8 MPa·m$^{1/2}$, such as less than 0.75 MPa·m$^{1/2}$, such as less than 0.7 MPa·m$^{1/2}$, and/or at least 0.4 MPa·m$^{1/2}$, such as at least 0.5 MPa·m$^{1/2}$. However, Applicants contemplate glasses with other fracture toughness values may likewise benefit from the present teachings. For example, some such glasses may have a fracture toughness greater than 0.7 MPa·m$^{1/2}$, but may have a fracture strain that still low enough that the fracture strain is less than that of the corresponding coating and may still benefit from the present disclosure.

A major surface of the glass substrates (see glass substrate 112 of FIG. 1), and more specifically the glass wafers as used for the testing leading to FIG. 2 and according to an aspect of the present disclosure, have an area of at least 500 mm$^2$, such as at least 1000 mm$^2$, such as at least 5000 mm$^2$, such as at least 10,000 mm$^2$, such as at least 20,000 mm$^2$, such as at least 50,000 mm$^2$, and/or no more than 10 m$^2$, such as no more than 1 m$^2$, such as no more than 0.5 m$^2$, such as no more than 0.25 m$^2$, such as no more than 100,000 mm$^2$. However, other surface areas are contemplated. Such a major surface need not be flat, as with the glass wafers. For example, Applicants contemplate curved windows and displays benefitting from the technology disclosed here. Such curved surfaces have a radius of curvature, as opposed to being flat with infinite radius.

Thickness T of the glass substrate, such as those as used for FIG. 2, is at least 20 μm, such as at least 30 μm, such as at least 50 μm, such as at least 80 μm, such as at least 100 μm, such as at least 150 μm, such as at least 250 μm, such as at least 400 μm, such as at least 500 μm, and/or no more than 5 cm, such as no more than 2 cm, such as no more than 1.5 cm, such as no more than 1 cm, such as no more than 8 mm, such as no more than 5 mm, such as no more than 3 mm, such as no more than 2 mm, such as no more than 1 mm, such as no more than 0.8 mm. As indicated above with respect to thickness of a medicinal container, the substrate may have more than one thickness, such as where the above bounds and ranges apply to a thickness thereof, such as thickness of a majority of the substrate in terms of volume of glass forming the respective substrate. However, other thicknesses T are contemplated.

Thickness $T_C$ of the coating layer (see coating layer 114 of FIG. 1), such as the coating layers used for the testing leading to FIG. 2, is at least 20 nm, such as at least 30 nm, such as at least 50 nm, such as at least 80 nm, such as at least 100 nm, such as at least 150nm, such as at least 250 nm, such as at least 400 nm, such as at least 500 nm, and/or no more than 15 μm, such as no more than 12 μm, such as no more than 10 μm, such as no more than 5 μm, such as no more than 3 μm, such as no more than 2 μm, such as no more than 1 μm, such as no more than 0.8 μm. However, other thicknesses $T_C$ are contemplated.

According to an aspect of the present disclosure, the thickness T of the glass substrate 112 is far greater than the coating thickness $T_C$. More specifically, according to an aspect of the present disclosure, the thickness T of the glass substrate 112 is at least 20 times greater than the coating thickness $T_C$ of the coating layer 114, such as at least 50 times greater, such as at least 80 times greater, such as at least 100 times greater, such as at least 200 times greater, such as at least 400 times greater, such as at least 500 times greater, and/or no more than 1E6 times greater, where "E" stands for "times ten raised to the power of the number following E." However, other differences between thicknesses T and $T_C$ are contemplated, such as thickness T less than 20 times thickness $T_C$.

Benefits of the present technology may not be particularly dependent on thickness T, but thicker glass substrates may experience less stress for a given load and therefore be less likely to fracture. With that said, the strengthening impact of the coating layer 114 relative to the proportional strength contribution provided by the coating layer 114 to the overall glass-based substrate is more surprising for thicker glass substrates 112 and highlights the synergistic effects of the coating layer 114 to strengthen the glass substrate 112. As demonstrated with examples disclosed herein, the coating layer 114 may have a coating thickness $T_C$ less than 1 μm for a glass substrate 112 more than 600 times thicker than the coating layer 114, but may still result in a strength increase of about 100 MPa!

Elastic modulus of the glass substrate, as used for FIG. 2, was greater than 60 GPa, such as greater than 80 GPa, such as greater than 100 GPa, such as greater than 110 GPa, and/or less than 160 GPa, such as less than 150 GPa, such as less than 130 GPa, such as less than 120 GPa. Accordingly, the glass of the glass substrate has a modulus of elasticity such that when 500 kPa of tensile stress is applied to the glass, the glass strains no more than 5.5 μm/m but at least 3.1 μm/m, such as no more than 5.2 μm but at least 4.3 μm.

By contrast, the elastic modulus of the coating of the coating layer (see coating layer 114) was less than 1.1 times that of the glass of the corresponding glass substrate over a common stress range (such as at some, most, or all stresses within an elastic regime of the respective material) or over a common amount of strain (such as an amount between 0 and the fracture strain of the glass of the glass substrate, on average; e.g., between strains of the glass corresponding to 0 and 500 kPa tensile load). In at least some such instances, an elastic modulus of the coating is less than that of the glass of the glass substrate, such as at least 10GPa less, such as at least 20 GPa less, such as at least 30 GPa less and/or at least 0.1 times that of the glass of the glass substrate, such as at least 0.3 times that of the glass, such as at least 0.5 times that of the glass. While the coatings demonstrated in the examples have such attributes, other coatings such as silicon nitride may have higher moduli and not be so easily paired with glasses to achieve the combined assembly properties disclosed herein.

While the elastic modulus of the coating may be less than about 1.1 times the glass, the elastic modulus of the coating of a coating layer 114 should at least be stiff enough to sufficiently constrain cracks on a surface of the underlying glass substrate 112 in order to achieve strength improvements as disclosed herein. According to an aspect of the present disclosure, an elastic modulus of the coating of the coating layer 114 was at least 500 kPa, such as at least 1 GPa, such as at least 10 GPa, such as at least 20 GPa, such as at least 25 GPa, such as at least 50 GPa, such as at least 60 GPa, and/or no more than 150 GPa, such as no more than 130 GPa, such as no more than 110 GPa, such as no more than 100 GPa, such as no more than 90 GPa. Or, as indicated above, the elastic modulus of the coating of the coating layer 114, according to an aspect, is at least 0.3 times that of the glass, such as at least 0.5 times that of the glass; or is at least 0.4 times, at least 0.6 times that of the glass. However, other elastic moduli are contemplated.

According to an aspect of the present disclosure, at zero strain and/or flexing of the glass-based assembly 110, stress in the coating layer 114 is low, such as less than 100 MPa in tension, such as near zero (e.g., within 10 MPa thereof) or in compression. Put another way, the coating layer 114 may be largely free or fully free of residual stress (i.e. tension).

According to an aspect of the present disclosure, as the coating is in the coating layer 114 when laminated to the glass substrate 112, an elastic behavior regime of the coating fully overlaps a range of zero strain to fracture strain of the glass of the glass substrate 112. Accordingly, if the glass-based assembly 110 is stretched and relaxed without breaking the glass substrate 112, the coating layer 114 operates within the elastic regime of the coating (allowing for some hysteresis, or fatigue effects for repeated loading as described above).

Load (x-axis) in FIG. 2 correlates to stress in the glass of a glass wafer being tested, and Applicants find use of a finite element model to convert load to stress presents a more accurate representation of ring-on-ring behavior than simply using beam theory to convert load to stress. For this test setup, using finite element analysis, Applicants estimate stress in the glass (bare or coated) in megapascals (MPa) to be the following complex polynomial function of applied load in kilograms force (kgf) between the rings:

$$y = -5.9695E{-}07 \times x^{\wedge}4 + 3.1132E{-}04x^{\wedge}3 -$$
$$6.2971E - 02x^{\wedge}2 + 1.0904E + 01x + 7.4458E - 01,$$

where "y" is stress and "x" is force, where "E" means 'times 10 to the exponent power of the number following the E,' and where hat symbol ("^") means 'to the exponent power of the number following the hat symbol.' These values theoretically align with results that may be measured manually using a strain gauge, such as using digital image correlation. Further, the finite element analysis and correction should be validated by strain gauge (or other empirical measurement). Alternatively strain gauge measurements may be used for stress and strain data (e.g., failure strain) if such numerical modeling does not align with empirical results.

Figure 3A:
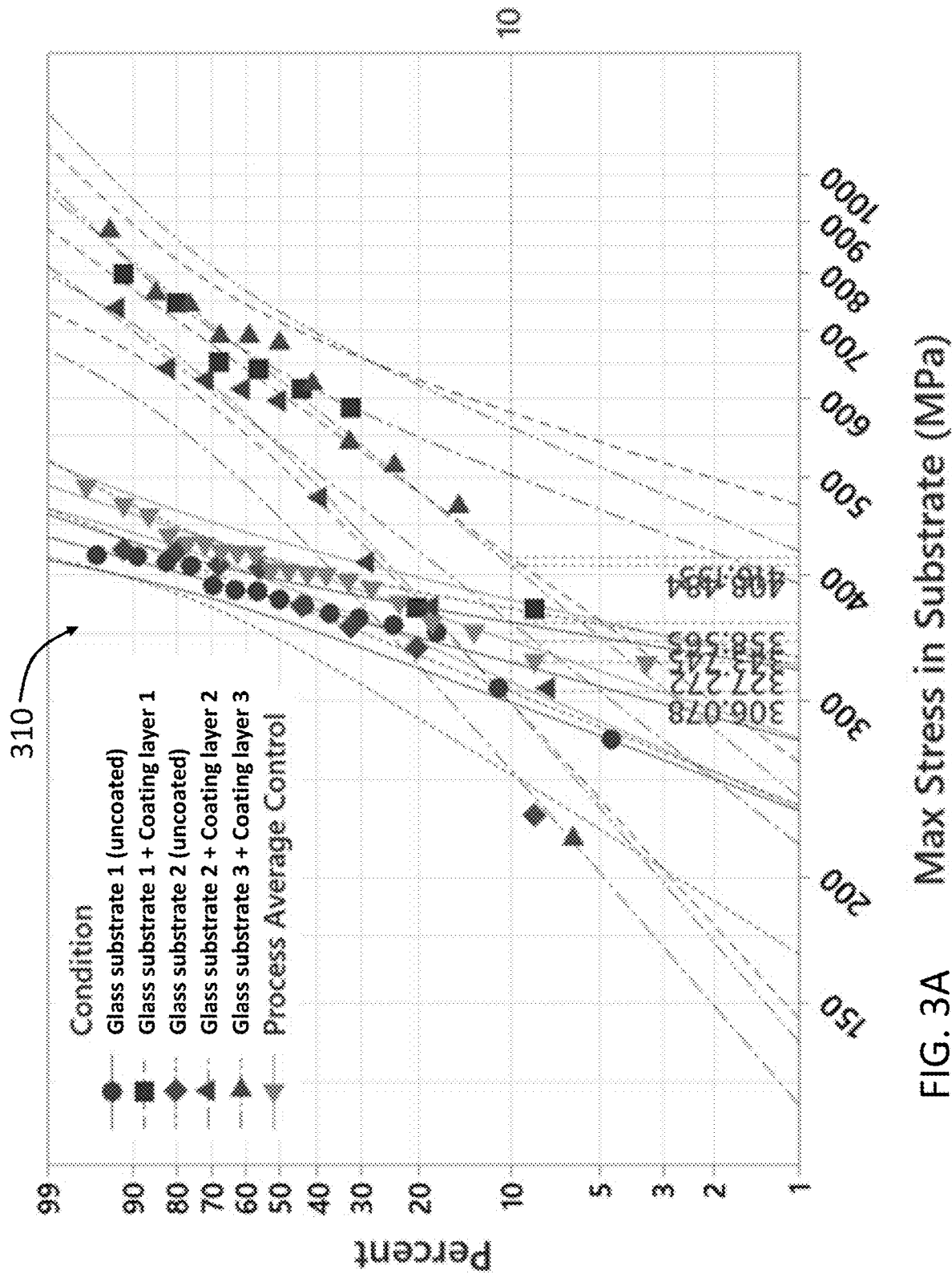
FIG. 3A is a Weibull plot of maximum stress (MPa), or ultimate stress, of bare and coated glass substrates according to an aspect of the present disclosure.

Referring now to FIG. 3, several glasses and coatings were tested, showing similar strengthening behavior by the combined glass substrate and coatings, as discussed above with respect to FIG. 2, but with the load converted to Max Stress (aka stress at failure, ultimate stress) in the substrate (coated or bare) using the above described finite element model. Similar to FIG. 2, plot 310 of FIG. 3 is a Weibull plot of 95% confidence interval with respect to ring-on-ring tests with the same size wafer samples. Brittle glass was again used, with "coating layer one" being 13 alternating sub-layers of oxides of tantalum and silicon applied via evaporative coating at about ⅔µm thickness $T_C$ in total for the coating layer one, coating layer two being 7 alternating sub-layers of oxides of tantalum and silicon at about ⅓µm thickness $T_C$, and coating layer three being simply layers of oxides of niobium and silicon applied via sputtering of correspondingly proportional thickness. All coatings in FIG. 3A were less than 1 micron in total thickness, very thin relative to 0.6 mm thick glass wafers. Other numbers of sub-layers are contemplated (e.g. 3, 5, 9, 11), including just one of any of the above coating materials as well as others having the mechanical properties disclosed.

Results of the tests showed the same significant strength improvement provided by the coating layers. In the plot 310, B10 ultimate strength values for the different glass-based assemblies were 306 MPa (rounded to the nearest integer) for uncoated glass substrate two, 327 MPa for uncoated glass substrate one, 344 MPa for "process average control," 359 MPa for glass substrate two coated with coating layer two, 408 MPa for glass substrate three with coating layer three, and 416 MPa for glass substrate one and coating layer one. Process average control was average from other tests using the same type of glass, but with better surface quality. Notably, the increase in B10 maximum strength (or ultimate strength) to the glass substrate provided by combining with the coating layer, as per the ring-on-ring tests, was at least 20 MPa, at least 30 MPa, at least 40 MPa, at least 50 MPa; and for coating and glass substrate one was also at least 60 MPa, at least 75 MPa, and/or no more than 10 GPa, such as no more than 5 GPa. Other strength changes are contemplated.

Figure 3B:
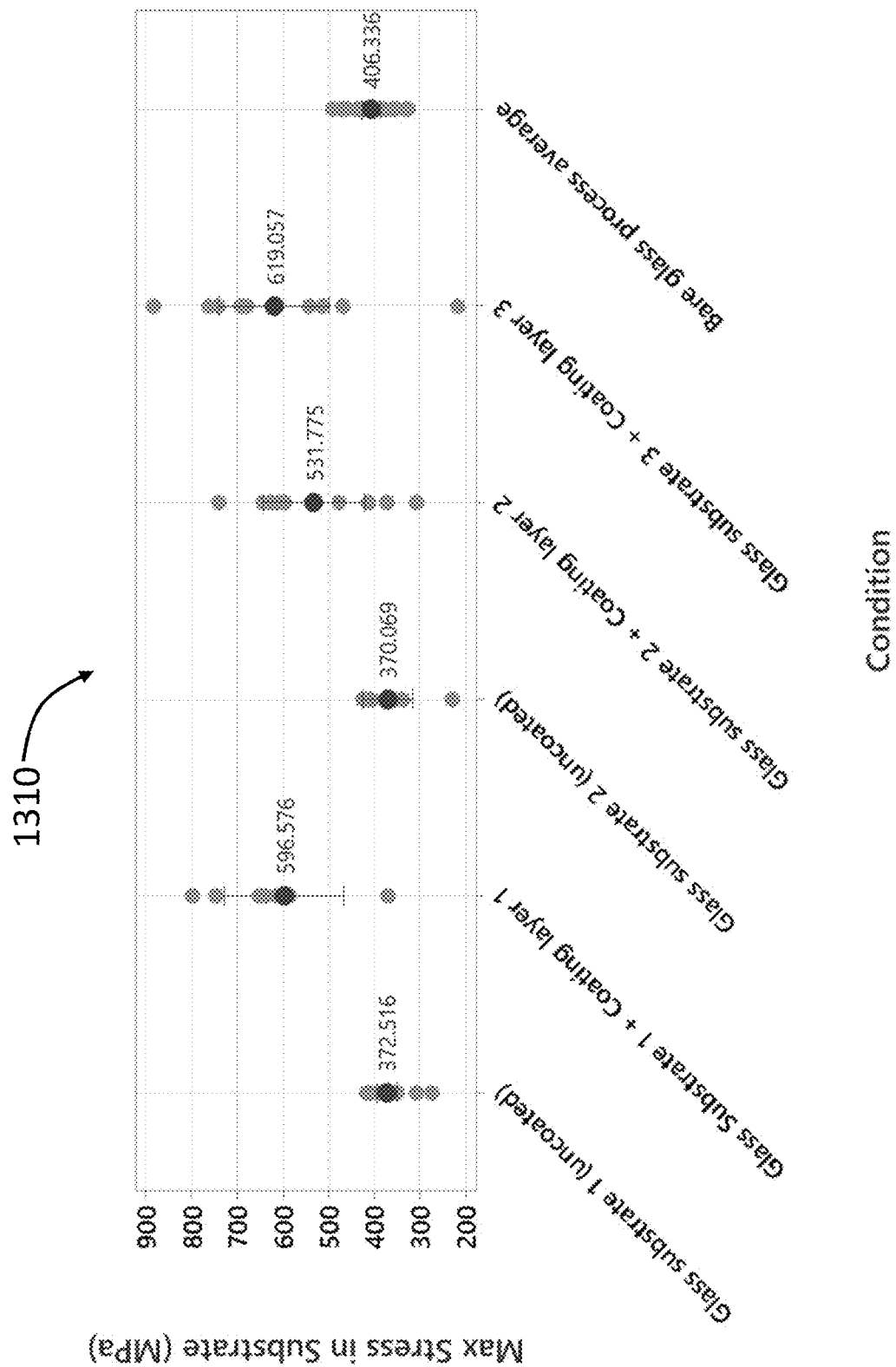
FIG. 3B is a plot of individual values of maximum stress (MPa), or ultimate stress, as a function of condition (e.g. bare and coated glass substrates) according to an aspect of the present disclosure.

In the plot 1310 of FIG. 3B, data of plot 310 is reorganized to show "Max Stress" or ultimate stress for each condition, with average ultimate stress specifically enumerated in the plot for each condition. Average ultimate strength values for the different glass-based assemblies were 370 MPa (rounded to the nearest integer) for uncoated glass substrate two, 373 MPa for uncoated glass substrate one (of similar composition to glass two), 406 MPa for "process average control," 532 MPa for glass substrate two coated with coating layer two, 619 MPa for glass substrate three with coating layer three, and 597 MPa for glass substrate one and coating layer one. Notably, the increase in average maximum strength (or ultimate strength) to the glass substrate provided by combining with the coating layer, as per the ring-on-ring tests, was at least 20 MPa, at least 50 MPa, at least 100 MPa, at least 150 MPa; and for coating and glass substrate one was also at least 200 MPa, at least 220 MPa, and/or no more than 10 GPa, such as no more than 5 GPa. Other strength changes are contemplated. Note "ultimate strength" or "average ultimate strength" means the average maximum strength from ring-on-ring testing as disclosed herein, from a statistically significant population, as specified herein, unless otherwise specified (e.g., B10 ultimate strength).

Surprisingly the coating thickness may not have been controlling in achieving the strength increases observed, as demonstrated with respect to the tests shown in FIGS. 3A-3B. While the fewer sub-layers of coating for glass substrate two with coating layer two had a less average maximum strength than glass substrate one with coating layer one (532 MPa versus 597 MPa), glass substrate 3 and coating layer 3 had the highest average maximum strength (619 MPa). Perhaps more important is an ability of the coating of the coating layer 114 to hold together and stay laminated to the glass substrate 112, constraining and insulating crack-initiation sites on the major surface 116 thereof, while the glass of the glass substrate 112 is loaded to failure.

Figure 4:
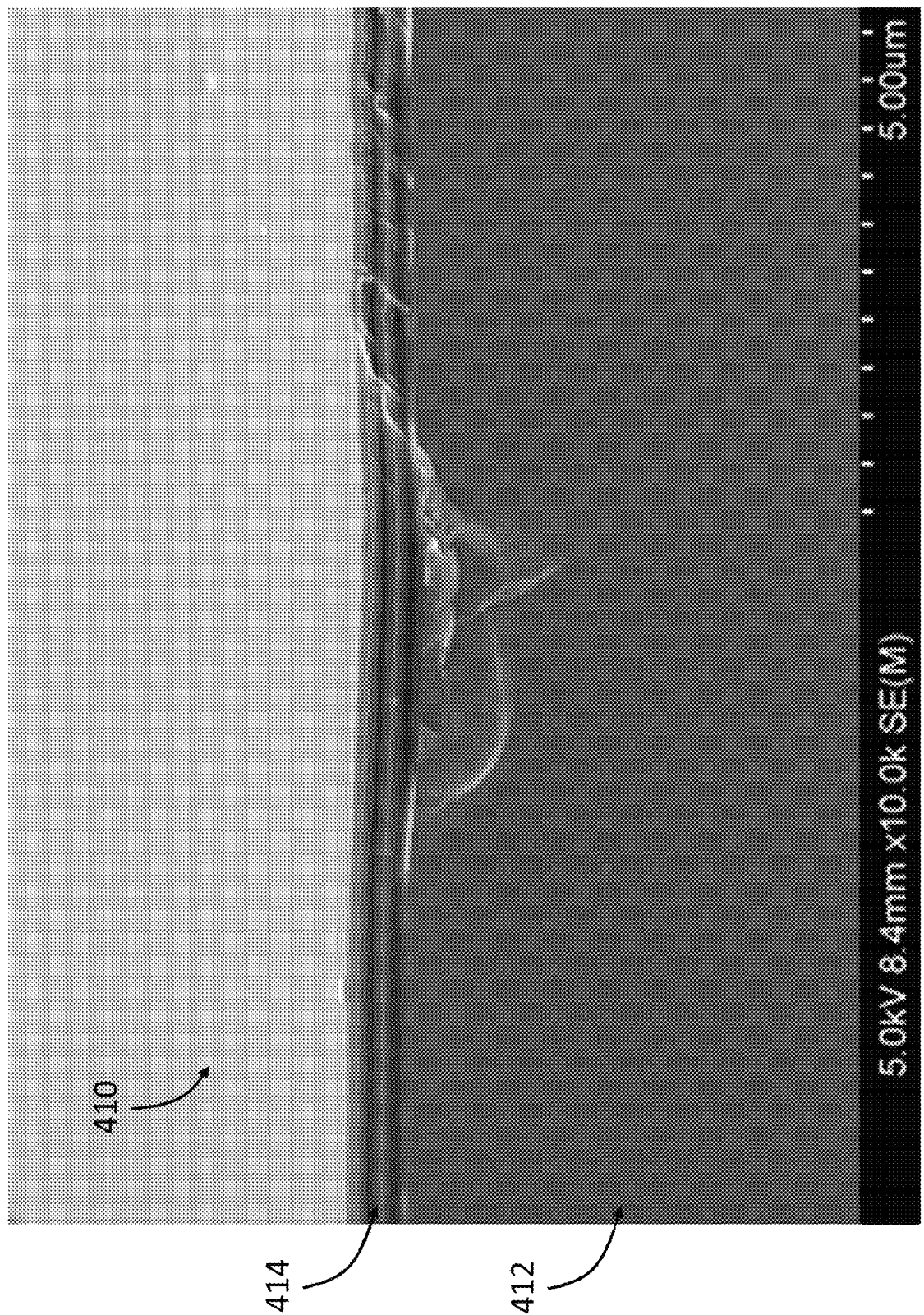
FIGS. 4-5 are micrographs from a side view of glass-based assemblies showing a location from which cracks propagated according to an aspect of the present disclosure.
Figure 5:
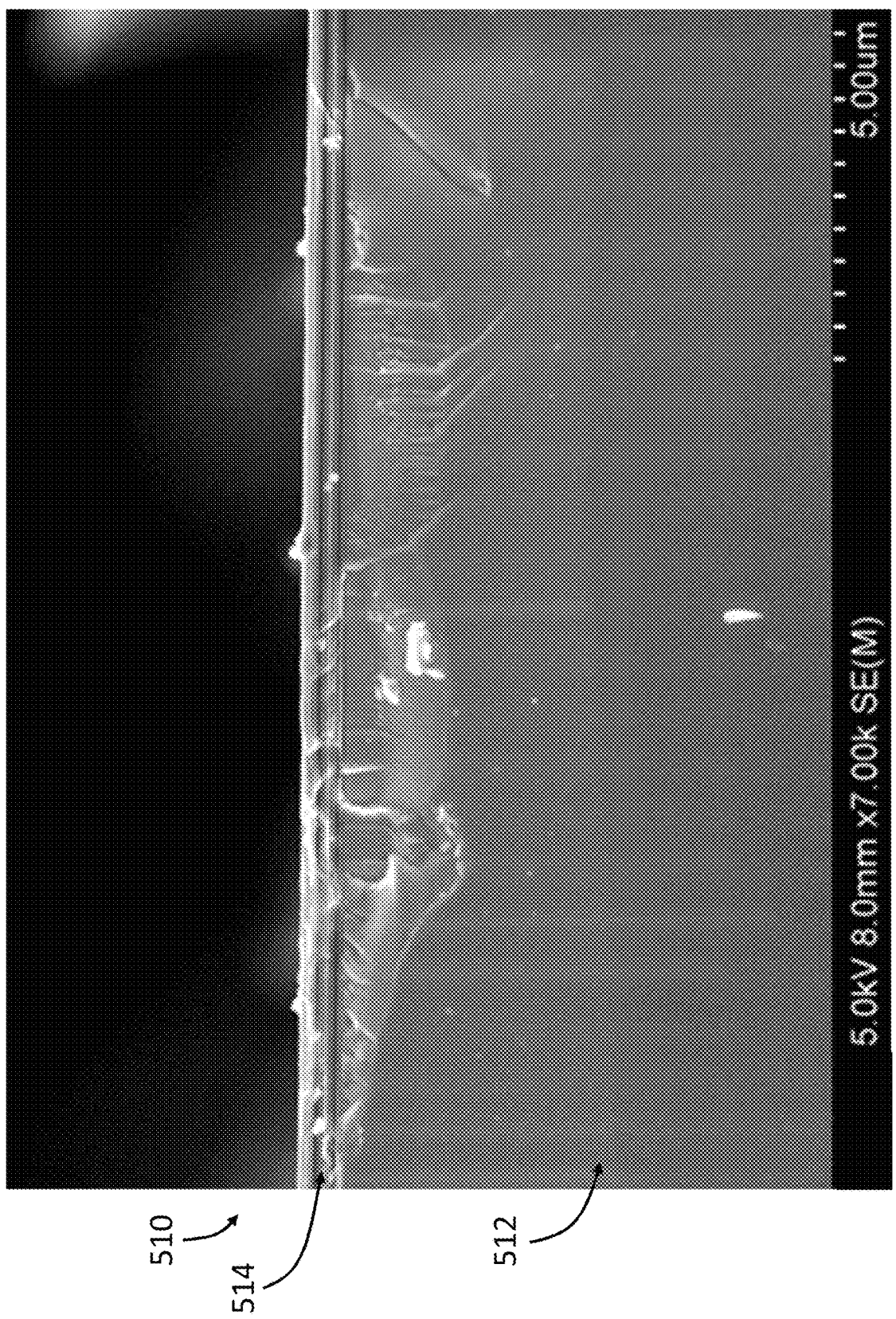

Referring now to FIGS. 4-7, Applicants analyzed physical microscopic results of the tests to better understand underlying mechanics. Referring first to FIGS. 4 and 5, each show a glass-based assembly 410, 510 including a coating layer 414, 514 overlaying and laminated to a glass substrate 412, 512. In each image, cracking from ring-on-ring testing has occurred. Upon close inspection of the crack geometry and direction of propagation, Applicants believe that cracks first initiated in the glass of the glass substrates 412, 512 and spread through the glass substrates 412, 512 before then fracturing the coating layers 414, 514. Also notably, even though the glass-based assemblies 410, 510 in FIGS. 4 and 5 have failed, the respective coating layers 414, 514 still appear fully laminated to the respective glass substrates 412, 512. The coating layer 414 in FIG. 4 is even deformed in the middle of the micrograph, bending to stay in contact with the underlying glass substrate 412, further evidencing strength of the bond therebetween.

Figure 6:
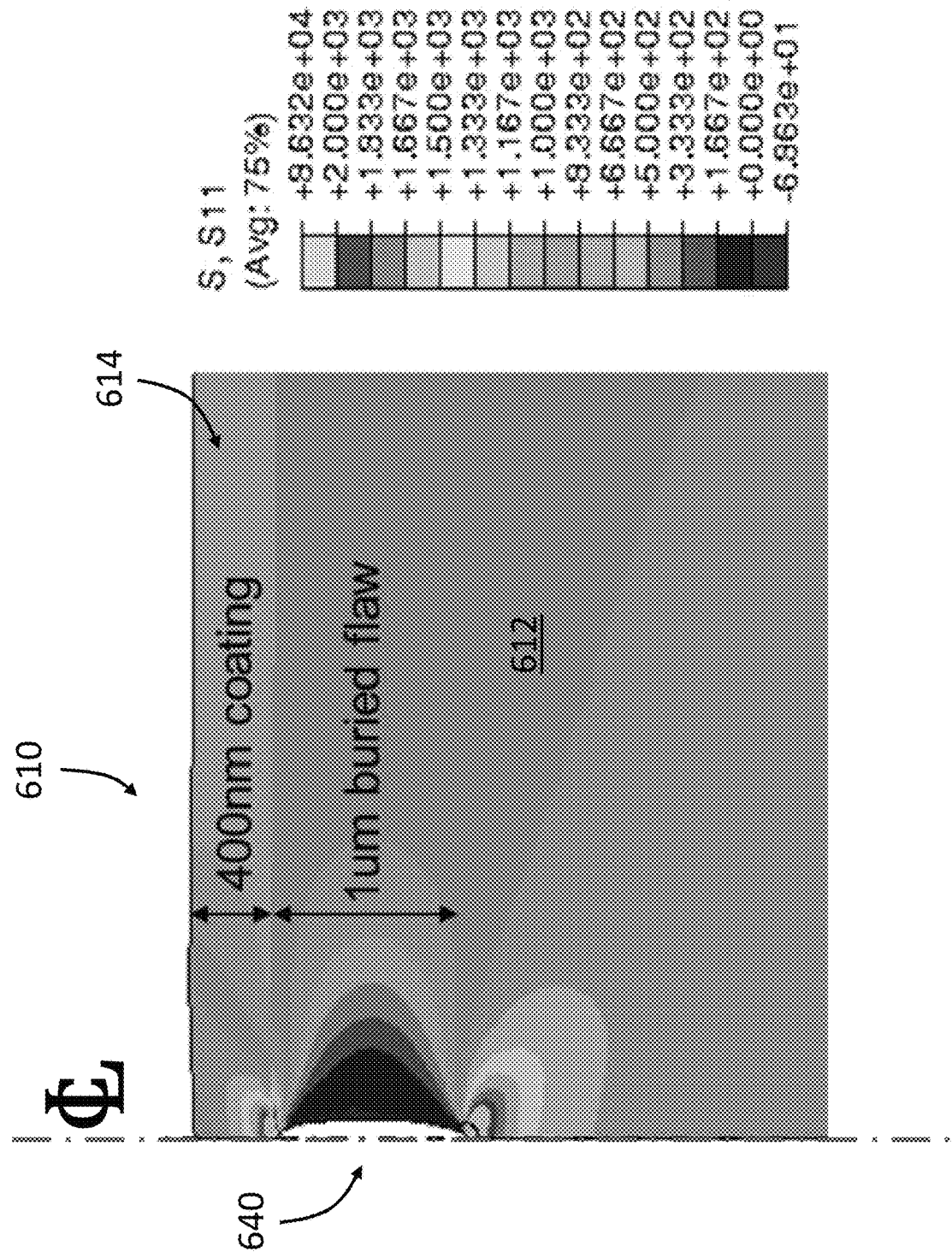
FIG. 6 is a portion of a finite element model including a buried flaw crack extending to a surface of a glass substrate, but beneath a coating layer according to an aspect of the present disclosure.

FIG. 6 shows a model 610 representative of finite element modeling of a glass-based assembly. The model 610 shows displacement when the model 610 is loaded away from the centerline ($\mathcal{C}_L$). As per the model, a glass portion 612 has initially started to crack (i.e. "1 μm buried flaw"), near a surface 616 of the glass portion 612 and beneath a coating portion 614 ("400 nm coating"). This model 610 and loading may be representative of the glass-based assemblies 410, 510 just prior to the failures of FIGS. 4-5. Notably, in FIG. 6, deformation of crack 640 is exaggerated by a factor of 10 to visually emphasize sites of greater strain. Also, the model 610 in FIG. 6 is only a small corner portion of a larger finite element model, zoomed in to focus on the crack 640. As per the model 610, the coating portion 614 holds an end of the crack 640 together, and thereby decreases the ability of the crack 640 to grow as the glass portion 612 is stressed normal to the length of the crack 640 (along the centerline in FIG. 6). This modeling analysis aligns with explanations first presented above for the observed significantly increased strength of the glass-based assembly.

According to an aspect of the present disclosure, the coating layer 114 blocks water vapor in air at 25° C., 70% relative humidity, standard atmospheric pressure from reaching the glass substrate underlying the coating layer. More specifically the coating layer 114 blocks water vapor carried in the air from reaching crack tips and hastening failure of a glass-based assembly 110 as disclosed herein.

Figure 7:
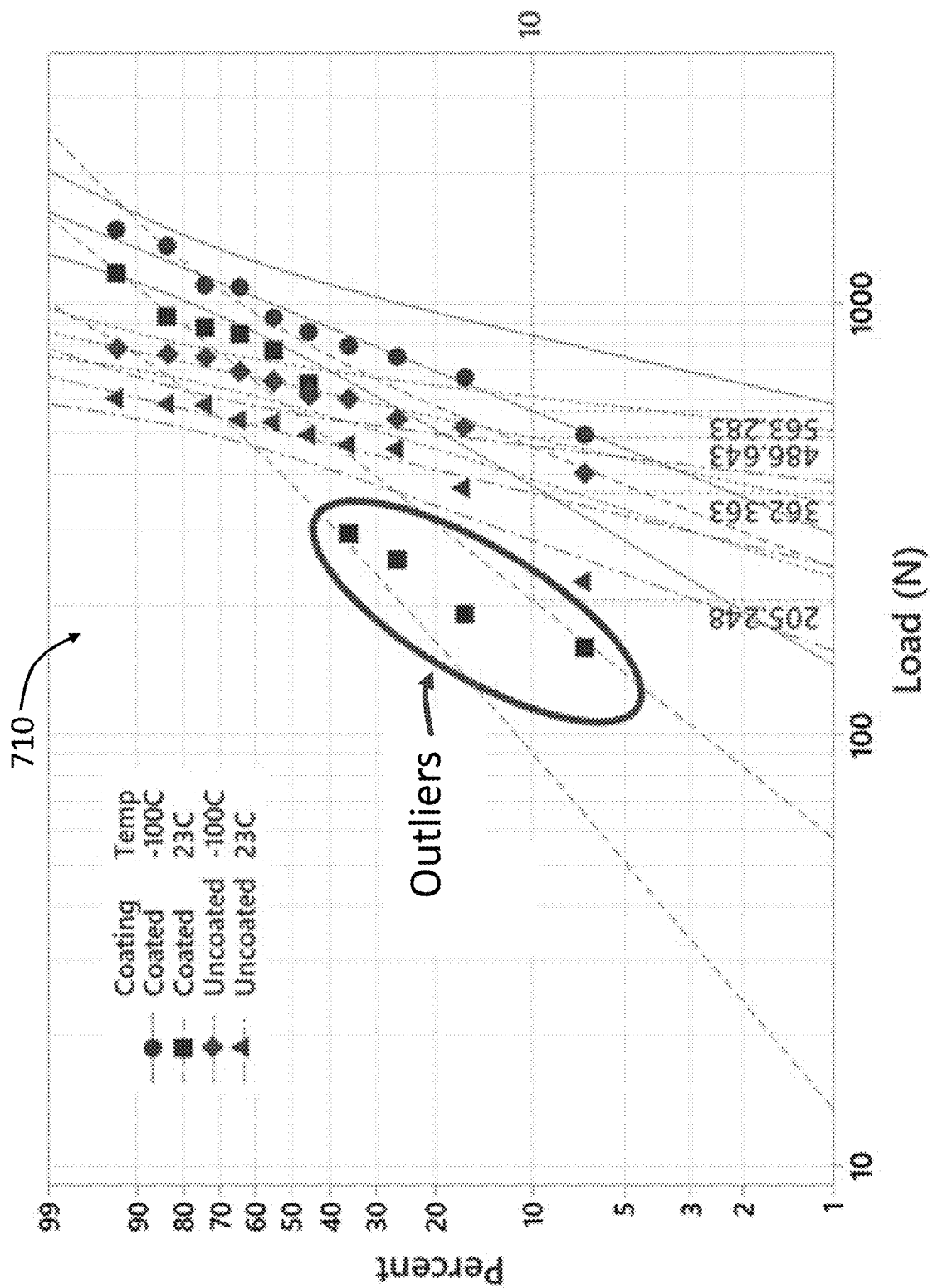
FIG. 7 is a Weibull plot of maximum load (N) of bare and coated glass substrates at room temperature (23° C.) and −100° C., a temperature corresponding to essentially zero water vapor carried in the air, according to an aspect of the present disclosure.

With FIG. 7, similar glass substrates to those of FIGS. 2-3, both coated and uncoated, were again tested, but this time at two different temperatures: room temperature (23° C.) and −100° C. The latter, very cold temperature corresponded to an air temperature carrying little if any water vapor. With this experiment, Applicants tried to determine impact of water vapor reaching exposed cracks, versus those that were shielded from water vapor by a coating layer. FIG. 7 accordingly presents a plot 710 of the results, again Weibull with 95% confidence. Applicants found perhaps some but little impact of water vapor in the air on crack growth with the borate glass. But functioning of a coating as disclosed herein to block water vapor from reaching a crack tip may show greater benefits in strength for glass-based assemblies using silicate glasses or glasses that quickly react to air or water vapor.

Notably a distinction between coated and uncoated glass wafers in FIG. 7 (divergent groups of extrapolated curves) is not as visually apparent in FIG. 7 as is the case for FIG. 2 or 3. This may be because four data points, circled and labeled "Outliers" in FIG. 7, corresponding to coated glass wafers at room temperature, failed well before expected, even before uncoated samples. Applicants believe these Outliers were failures due to scratch or contact damage on the respective coating layers. Put another way, in these Outlier samples, the coatings failed first-then scratch or contact damage in the coatings may have concentrated stresses on the underlying glass substrate. This is the weakening behavior that may be more expected for coatings of glass and serves as counterexamples to other data herein.

Figure 8:
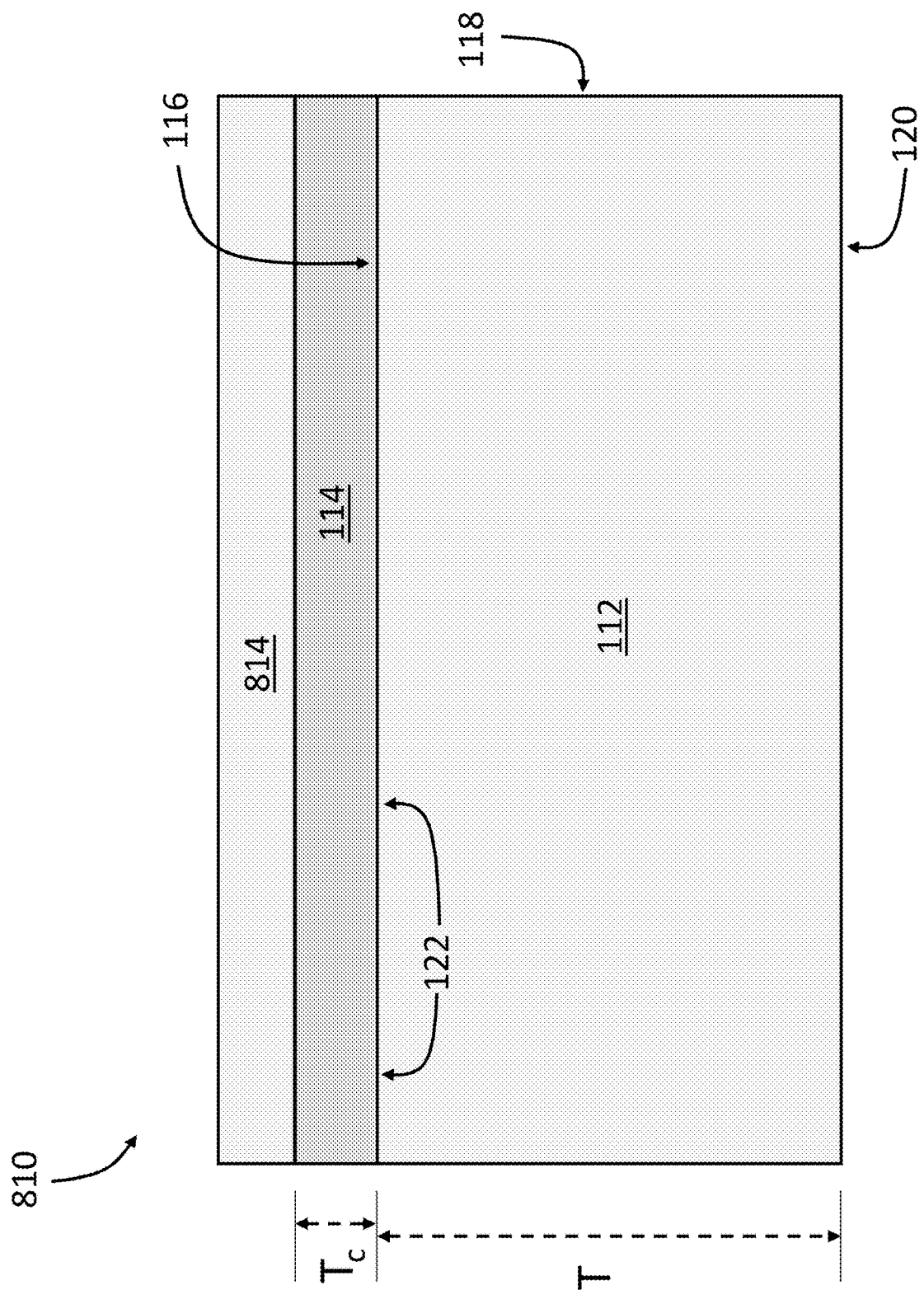
FIG. 8 is a schematic view of another conceptual glass-based assembly according to an aspect of the present disclosure.

Referring now to FIG. 8, a glass-based assembly 810 according to an aspect of the present disclosure has structure as described above with respect to FIG. 1, and additionally includes a layer 814. The layer 814 may be a second coating layer, such as of a hard, scratch-resistant coating, where fracture toughness and/or modulus of the layer 814 are greater than the coating layer 114, such as at least 20% greater, 50% greater. In such cases, the coating layer 114 may insulate the glass substrate 112 from cracks formed in the layer 814.

According to an aspect of the present disclosure, the layer 814 may alternatively be a glass layer, such as in a laminate structure as described above. The glass of the layer 814 may likewise differ from coating of the coating layer 114 in terms of mechanical properties, such as with respect to elasticity, ultimate strength, geometry, as has already been described with respect to the glass of the glass substrate 112 differing from the coating of the coating layer 114.

The test wafers (bare and coated) corresponding to tests discussed with respect to FIGS. 2-3 and 7, had comparable surface qualities. However, according to an aspect of the present disclosure, glass substrates, especially brittle and fragile glass substrates (e.g., high-index glasses), may be coated according to the disclosure provided herein, to increase strength of the glasses without the perhaps time consuming and tedious tasks of finely polishing surfaces thereof. Put another way, a coating layer overlaying and laminated to a glass substrate as disclosed herein may compensate for loss of strength of the glass substrate due to rougher surfaces thereof.

Figure 9:
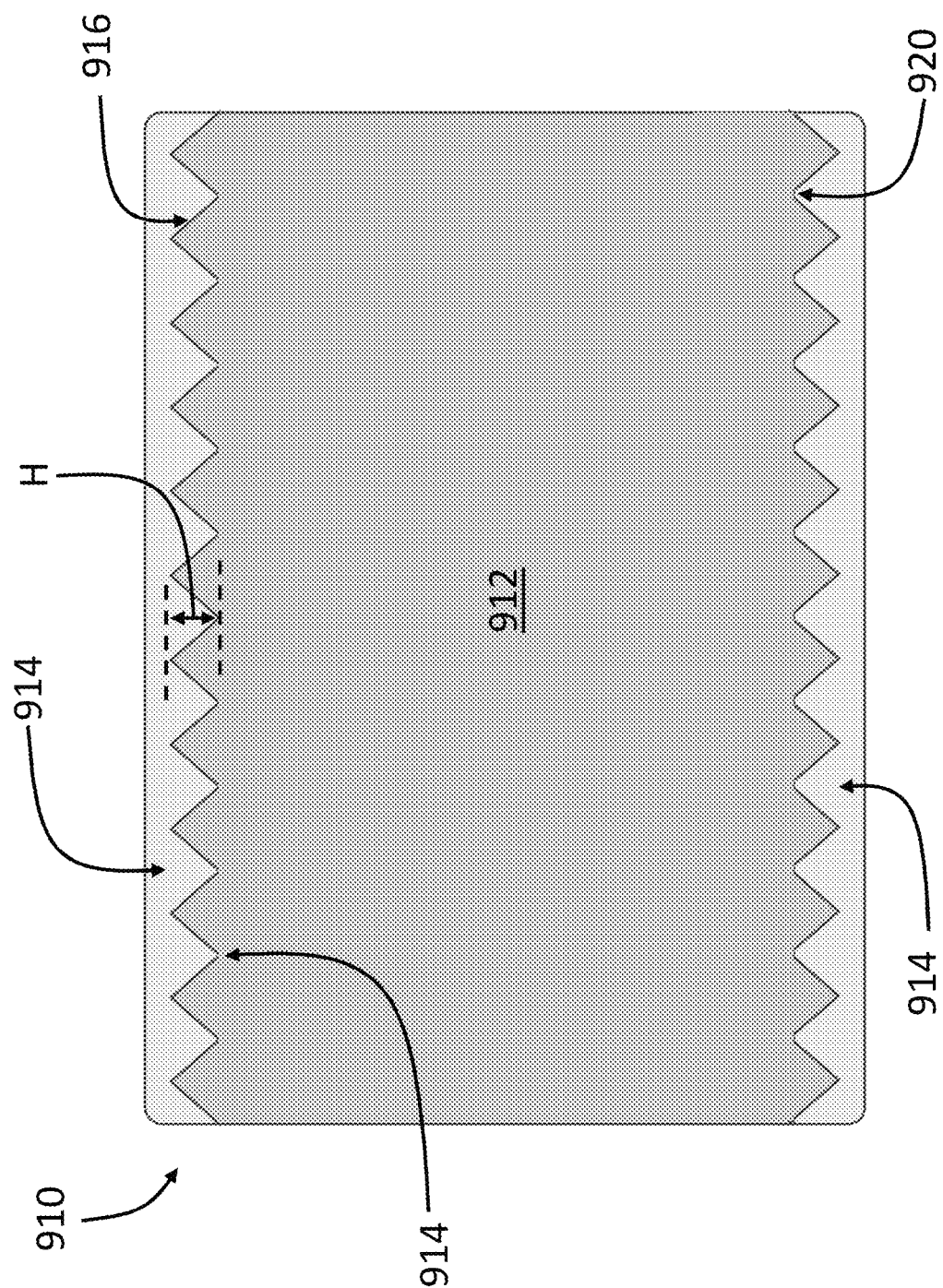
FIG. 9 is a schematic view of yet another conceptual glass-based assembly according to an aspect of the present disclosure.

Referring now to FIG. 9, a glass-based assembly 910 includes a glass substrate 912 and a coating layer 914 overlaying and laminated thereto. First and second major surfaces 916, 920 are roughly cut, such wire cut from a boule, perhaps with some lapping and/or polishing. However, the first and second major surfaces 916, 920 include striations 960 (aka grooves from abrasive wear). Such striations 960 may be a source of stress concentration, and may otherwise facilitate crack initiation and growth as the corresponding glass substrate 912 is loaded. However, coating layers 914 may oppose crack growth from the striations 960 by constraining an open end of such crack initiation sites.

As such, according to an aspect of the present disclosure, the glass substrate 912 as shown in FIG. 9 includes striations 960 that are visible at least upon microscopic inspection of the major surface(s) 916, 920. The striations 960 are elongate grooves, having a length at least 5 times a width thereof, where width is measured from local peak to adjacent local peak (e.g., >50 nm, such as >100 nm, such as >500 nm, such as >1 μm, and/or <1 mm, such as <500 μm, such as <200 μm, such as <100 μm, such as <50 μm) and length is the distance along the respective surface crosswise to width, having a length less than or equal to fully across the respective major surface 916, 920, but at least 5 times any of the width inequality dimensions just disclosed.

A difference in peak to valley height H of the striation(s) 960 may be greater than 50 nm, such as >75 nm, such as >100 nm, such as >500 nm, such as >1 µm, and/or less than 50 µm, such as <20 µm, such as <10 µm, such as <5 µm, as may be measured by optical profilometer. According to an aspect of the present disclosure, glasses that still benefit from the technologies disclosed herein have low roughness, such as Ra<50 nm, such as Ra<10 nm, such as Ra<5 nm, such as Ra<1 nm measured over one linear cm along a major surface. Further, according to an aspect of the present disclosure, two or more of the striations 960 adjacent to one another may be directed lengthwise in a common direction (e.g., generally parallel to one another). According to an aspect of the present disclosure, such a surface 916, 920 includes at least two striations 960 adjacent and commonly directed, such as at least 5, at least 10, at least 100, at least 500 such striations 960.

A less-polished surface (see generally surfaces 916, 920) may improve adhesion of the coating layer 914 to the surface 916, 920 of the glass substrate 912, portions of the coating layer 914 extending into grooves of the striations 960 may be anchored and less likely to slip apart or delaminate from the underlying glass substrate. In turn, preventing localized delamination may be a source of improved strength of the overall glass-based assembly 910. On a local surface level, locations where the coating layer 914 is bonded immediately adjacent to locations where the coating layer 914 is delaminated may provide discontinuity in stress, and stress concentrations on the major surface 916, 920, leading to increased chances of crack formation and failure at lesser ultimate load.

Figure 10:
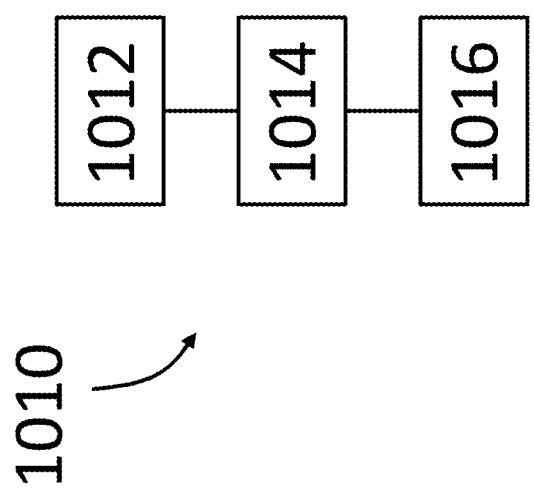
FIG. 10 is a flow chart of a method of making a glass-based assembly according to an aspect of the present disclosure.

Referring to FIG. 10, a method 1010 of making a glass-based assembly according to an aspect of the present disclosure may include a step 1012 of cutting a glass substrate (e.g., wafer, panel, cover) from a source of glass (e.g., boule, sheet, roll) as described above, where the glass substrate includes a glass as described herein (e.g., geometrically, elastically, above surface qualities).

The method 1010 further includes a step 1014 of coating the glass substrate with a coating layer as disclosed above, and thereby strengthening the glass substrate (see generally glass-based assembly 110 of FIG. 1 and corresponding glass substrate 112 and coating layer 114). Executing the step 1014 of coating the glass substrate at a proximate time (e.g., within one hour, 10 minutes, 5 minutes) and/or proximate location (e.g., within 1 km, such as within 500 m, such as within 100 m) to executing the step 1012 of cutting the glass substrate may be beneficial to subsequent handling and processing, especially for brittle, thin glasses described herein. For example, the method 1010 may further include a step 1016 of inserting the glass-based assembly (coating layer on glass substrate) into or on a device, such as a window frame, display housing, etc. This step 1016 of inserting may include flexing the glass-based assembly, where the coating remains fully laminated to the glass substate when flexed and operates within the elastic regime of the coating material during the flexing.

Figure 11:
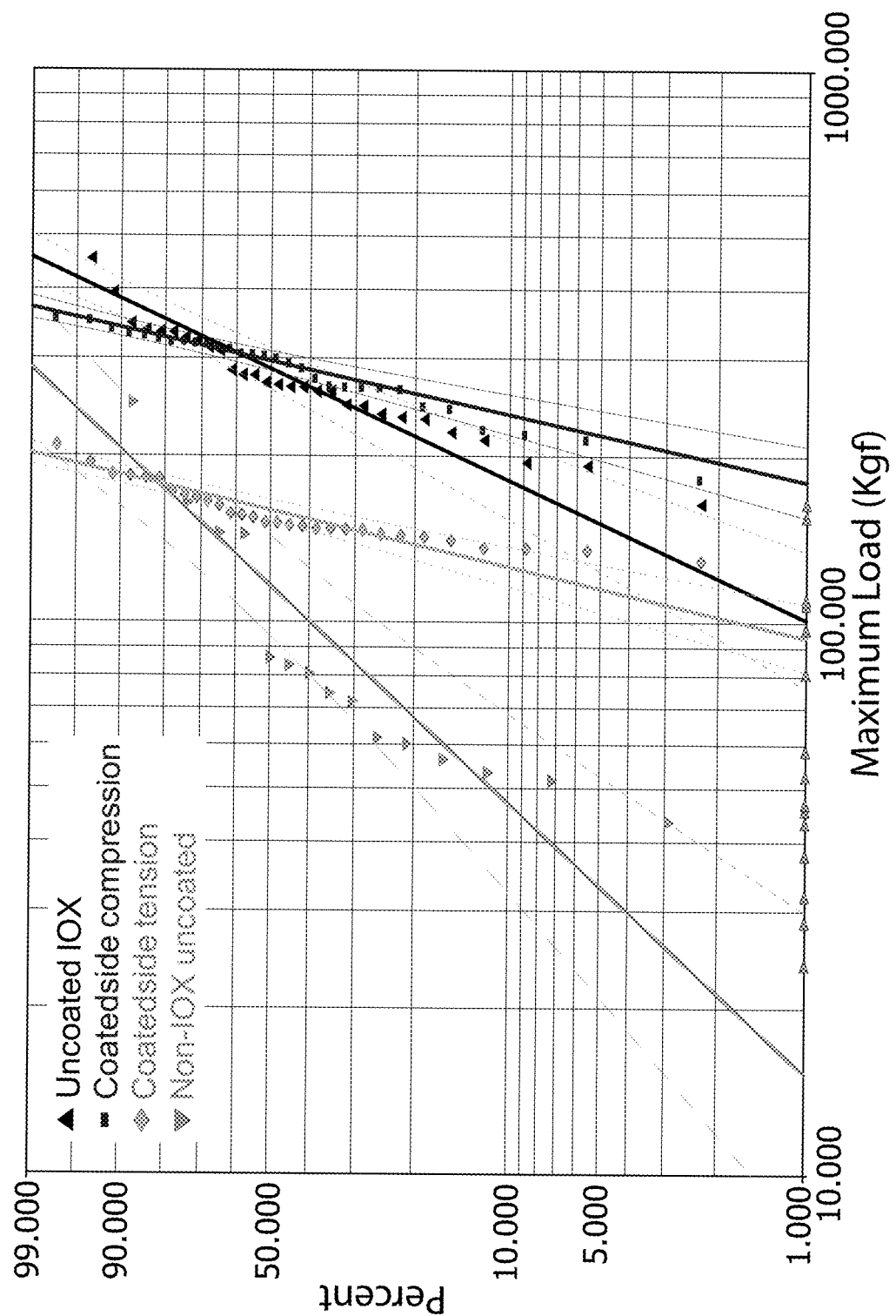
FIG. 11 is a Weibull plot of maximum load (Kgf), or load at fracture, of bare, ion-exchange, and coated glass substrates.

FIG. 11 is provided for further context. Substrates of CORNING® GORILLA® GLASS 3 were coated by a stack of alternating niobia and silica layers, similar to those disclosed above, and then loaded until failure in a ring-on-ring test setup. As shown, uncoated, non-ion-exchanged substrates failed at the lowest loads in FIG. 11. However, CORNING® GORILLA® GLASS 3 is typically a strong glass, at least in part because it may be strengthened by ion-exchange; and with respect to FIG. 11, all but the "non-iox uncoated" samples were ion-exchanged. Ion-exchanged but uncoated samples and samples with the coating-side in compression performed the best, and comparable to one another. However, as evidenced by the data in FIG. 11, samples with coated-side in tension (i.e. facing away from the smaller ring) clearly lost strength compared to uncoated substrates.

In contrast to glass-based assemblies discussed herein before FIG. 11, the glass-based assemblies of FIG. 11 were weakened with the coating, compared to uncoated glass. There may be a number of different reasons why the coated samples of CORNING® GORILLA® GLASS 3 in FIG. 11 (with the coated-side in tension) lost strength relative to the uncoated samples. For example, there may be an adverse chemical reaction between the coating the glass. The coating, if poorly constructed or applied, may include defects or particles that may apply a point load on the glass and a corresponding stress concentration. The glass itself may have pre-existing initiated cracks. However, without being bound to any theory and in view of the presently disclosed technology, Applicants believe that the weaking of the coated CORNING® GORILLA® GLASS 3 may at least in part be because the coating failed before the glass. Or, put another way, stretching of the coating of the coating layer to some strain less than the fracture strain of the CORNING® GORILLA® GLASS 3 of the glass substrate (in the ring-on-ring test), fractured the coating, possibly creating stress concentrations on the underlying glass at the coating-to-glass interface and/or where the coating no longer held together small nucleated cracks on the glass surface (in tension), which weakened the corresponding coated glass-based assembly.

Applicants note that without specifying a failure mode, placement of a coating on a glass substrate may increase "strength" of the combined assembly in various ways. For example, one way may be by strengthening the coated glass-based assembly with respect to scratching, such as if scratch formation is the failure mode. With that said, as disclosed above, Applicants herein refer to strength with respect to ring-on-ring performance, where the corresponding stress at failure is the ultimate strength, and where samples are strengthened with the coatings, as disclosed, by increasing the ultimate strength of the corresponding glass-based assembly with respect to a failure mode of fracture under ring-on-ring loading.

According to an aspect of the present disclosure, at least some glass substrates herein include small, nucleated cracks (or crack nucleation sites) on or near a surface thereof (e.g., within 10 µm of the surface of the glass substrate). The surface is coated as disclosed above, where the coating holds together an end of the nucleated cracks closest to the coating and mitigates propagation of the nucleated cracks. However, such nucleated cracks or crack nucleation sites may be very small and hard to detect, but may be evidenced by respective glass fracturing when loaded via ring-on-ring testing at an ultimate strength less than ideal when uncoated.

As indicated above, at zero strain and/or flexing of the glass-based assembly 110, stress in the coating layer 114 may be less than 100 MPa in tension, such as at or near zero or in compression. Applicants contemplate that having the coating in compression at zero strain and/or flexing of the glass-based assembly 110 may be beneficial to strength of the glass-bases assembly 110. Such compression may augment a strength increase of the glass-based assembly, in addition to other mechanisms disclosed herein, including where stretching of coating of the coating layer 114 to the fracture strain of the glass of the glass substrate 112 does not fracture the coating.

For example, the coating may have a compressive stress, such as a compressive stress of at least 20 MPa, at least 50 MPa, at least 100 MPa, at least 150 MPa and/or no more than 10 GPa, such as no more than 5 GPa, such as no more than 1 GPa. Placing the coating under a compressive stress at zero strain and/or flexing of the glass-based assembly 110 may facilitate use of stiffer coatings relative to the glass substrate 112, such as coatings having an elastic modulus greater than 0.8 times that of the glass and/or less than 1.1 times that of the glass, as disclosed above, or less than 1.5 times that of the glass, or less than 1.3 times that of the glass. The coating can be placed in compression during deposition, influenced by deposition temperature, deposition rate, deposition pressure, and deposition plasma energy.

A coating of a common or similar composition may have different physical attributes, such as hardness, fracture strain, elastic modulus, etc., depending upon a number of factors, such as chamber pressure, plasma energy, temperature during application of the coating, deposition rate, application technique, or various other factors as disclosed above, such as delaminations or patches of non-adhesion with the substrate, imperfections or defects in the coating, etc. Applicants find sputtering tends to give higher coating hardness than e-beam evaporation for example. Applicants measured a hardness value on the $Ta_2O_5/SiO_2$ coating stack disclosed above to be about 7.5 GPa. Accordingly, coatings disclosed herein have a hardness value greater than 4.5 GPa, such as greater than 5 GPa, greater than 6 GPa, and greater than 7 GPa, and/or less than 10 GPa, such as less than 9 GPa, less than 8 GPa. Hardness may be generally related to other physical attributes of a coating, but the degree of relation may correspondingly vary as a function of such factors as just disclosed.

As disclosed above, coating disclosed herein may have a particular elastic modulus relative to the respective glass substrate to form a glass-based assembly with increased ultimate strength. Example coatings include oxides, such as niobia, tantalum pentoxide, stacks thereof with intermediate silica layers, etc. Put another way, the coatings may largely be inorganic, because of physical attributes of such coatings. But polymeric coatings may be used to increase strength of a glass-based assembly as disclosed herein if such coatings have fracture strength and/or elasticity as disclosed above relative to the corresponding glass substrate.

Figure 12:
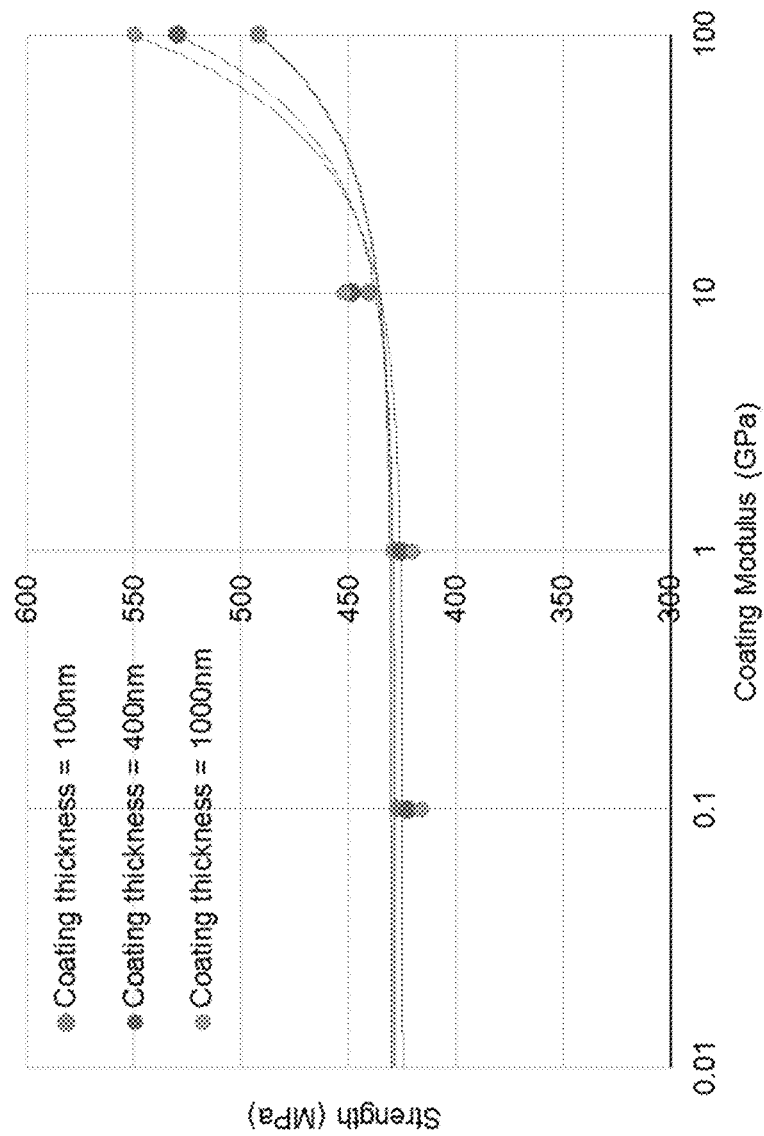
FIG. 12 is a plot from a finite element model of a glass-based assembly varying coating thickness and modulus, to see influence on strength.

Referring now to FIG. 12, Applicants have continued to explore other aspects of the presently disclosed technology, where in FIG. 12 modeling compares influence of coating modulus and coating thickness on strengthening effect as disclosed above for a common glass-based assembly with glasses as disclosed above (e.g., brittle). Accordingly, the amount of strengthening of such a glass-based assembly may plateau once the coating modulus is decreased below about 5 GPa, as shown in FIG. 12, somewhat regardless of coating thickness. As such, for glasses having a modulus greater than about 90 GPa, for coatings of thickness of at least about 100 nm, the coating modulus is at least 10 GPa, such as at least 15 GPa, but still has a fracture strain that allows for stretching of the coating of the coating layer to the fracture strain of the glass of the glass substrate without fracturing of the coating. Notably Applicants find use of finite element modeling of the ring-on-ring system, in combination with empirical measurements, helps to provide useful insight into stress and loading of the glass-based assemblies, such as helping to convert load at failure to stress at failure (see generally FIGS. 2-3 and corresponding text), especially for particularly thin glass substrates as disclosed above, such as those that may undergo large flexure and no longer fall within a regime of linear elasticity theory.

Figure 13:
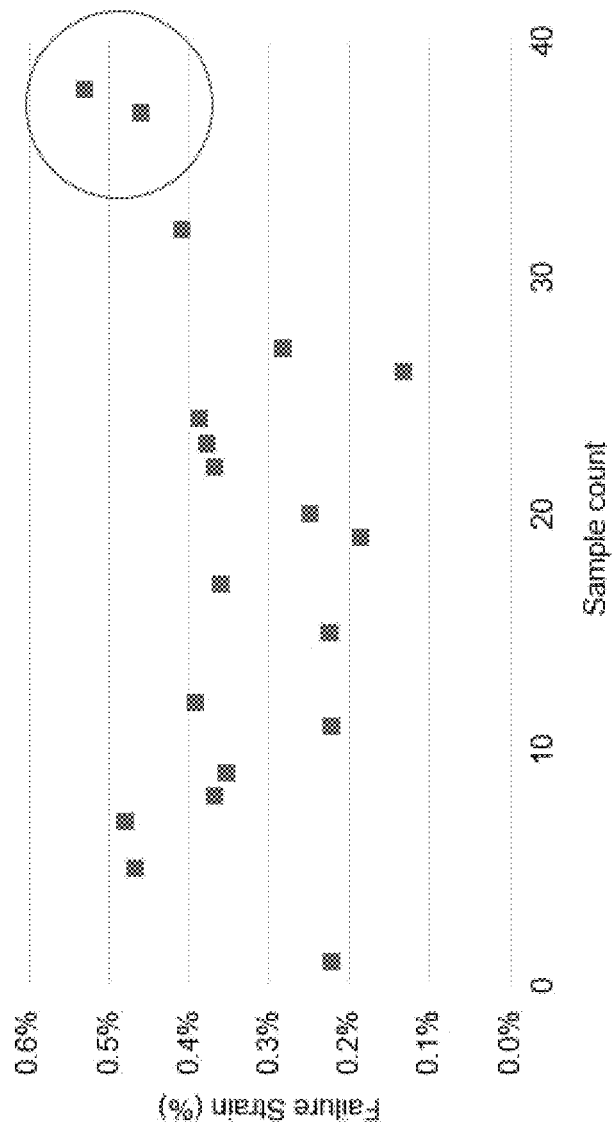
FIG. 13 is a plot of failure strain of glass-based assemblies.

Referring to FIG. 13, a plot, based on empirical examination of glass-based assemblies as disclosed herein having niobia/silica or tantalum/silica coatings described above (i.e. 13L Ta/Si, 7L Ta/Si and Nb/Si), shows failure strains for samples on the Y-axis. The X-axis is the sample count, but the plot only includes those samples that also have had failure modes determined from scanning electron microscopy.

In the plot, the two points circled (0.46% and 0.53%) were fracture failures determined to be stemming from coating failures (e.g., coating defect failures), but the rest were substrate-based failures (i.e. the glass failed first). Based on such findings, Applicants believe that a coating used with glass substrates disclosed herein may be selected to have a lower bound of coating crack onset strain to be 0.25%, such as 0.3%, such as greater than 0.4% or greater than 0.5%, and/or from any such a lower bound up to 2.0% for example.

Now, referring once more to FIG. 8, the coating 114 may be a soft buffer layer between the glass substrate and the layer 814, which may include inorganic coating layers as described above, such as hard, scratch-resistant coatings. Some such soft buffer layers may include organic coatings, such as silane, siloxane, and/or polymeric coatings. In such an arrangement, the coating 114 may remain intact and not fracture before glass of the glass substrate 112, when stretched in a combined glass-based assembly 810, such as when loaded in a ring-on-ring test assembly as disclosed above with the coating-side in tension. The layer 814 may crack but the coating 114 interrupts propagation of such cracks from the layer 814, and dulls impact of stress concentrations created thereby on the surface 122 of the glass.

As explained above, inorganic coatings have been found to reduce strength (e.g., flexural or ultimate strength; as measured via ring-on-ring or other flexural testing) of glasses, such as ion-exchanged glasses and other high-strength glasses for example. But, as further explained above, Applicants discovered certain coatings (e.g., inorganic coatings, silica-containing coatings, metal-oxide containing coatings; coatings of <1 µm rare earth metal oxide layers) have been observed to increase strength of certain glasses, such as brittle or high-elastic-modulus glasses, such as high-modulus glasses with relatively low or intermediate levels of such strength when uncoated (e.g., below 800 MPa, at least 100 MPa).

Applicants have continued to explore this technology and find that strength of additional glasses and glass-ceramics, such as those having low uncoated strength, may be enhanced by applying a coating to a surface thereof, where the coating as applied to the glass (e.g., possibly in a state of residual compression) has a crack onset strain greater than that of the glass. By identifying strengthening mechanisms through a combination of numerical modeling and empirical experimentation, a range of glasses and glass-ceramics have been identified to exhibit suitability for such strengthening, including and beyond those disclosed above.

According to an aspect, the strengthening technology may be useful for strengthening glasses and glass-ceramics unsuitable for ion-exchange strengthening, and for other purposes, such as improving handleability of weak glasses (e.g., those with surface flaws as disclosed herein, those with strength less than 500 MPa, such as less than 200 MPa), such as many of those with particularly high refractive indices (e.g., >1.9 at 589.3 nm) for example. Further, glasses and glass-ceramics may be strengthened by a combination of additional approaches, such as chemical-or thermal-tempering in addition to coating strengthening technology disclosed herein.

According to an aspect, different glass or glass-ceramic substrate-and-coating combinations exhibit a higher strength for the coated substrate than for the uncoated substrate i.e. without the coating. For example, high-modulus glasses and/or glass-ceramics may be particularly suitable, such as those glasses having modulus of elasticity between 90 to 160 GPa (in an elastic regime thereof), such as between 95 and 145 GPa. Applicants discovered that such high-modulus glasses may include compositions of both low silica content and high silica content. Strength of such uncoated glasses may range (on average in a statistically significant population) between 100 and 800 MPa, such as between 200 and 750 MPa. Further, uncoated failure strain levels of such glasses and glass ceramics may range from 0.2% to 1.5%, such as 1%, such as 0.5%; and/or the glasses may be flawed, having uncoated flaw depths (e.g., average flaw depth size range; alternatively, individual nucleated/initiated crack depths), such as of at least 50 nm, such as at least 100 nm, at least 150 nm, at least 250 nm, and/or no more than 50 µm, such as no more than 20 µm, no more than 10 µm, no more than 5 µm, no more than 3 µm, no more than 2.5 µm; such as average flaw depth size in a range of 250 nm to 3 µm and/or in a range of 150 µm to 2.5 µm.

According to an aspect, corresponding coatings may have a crack-onset strain that is greater than failure strain of an uncoated but otherwise similar version of the glass or glass-ceramic substrate of such an assembly. Such coatings may also have a crack onset strain (COS) greater than 0.4% and/or less than 1.5%, such as greater than 0.5% to less than 1.0%. Further, such coatings may have a crack-onset stress (COs) greater than 0.25 GPa and/or less than 3 GPa. Further still, the coatings may have an elastic modulus greater than 50 GPa and/or less than 250 GPa, such as greater than 60 GPa and/or less than 200 GPa. According to an aspect, a thickness of the coating may fall within a range of 20 nm to 1000 nm, such as from 50 to 800 nm. The coating may have a residual compressive stress, such as a stress of greater than 100 MPa to less than 1500 MPa, such as between 200 and 1200 MPa.

Building upon numerical analysis described above, Applicants developed a finite element model of glasses and coatings that are strengthened when the glass is coated as disclosed herein. More specifically, the finite element model uses ABAQUS simulation software provided by Dassault Systèmes Simulia Corp. In the model, a glass substrate was modeled with a linear elastic material model, using Young's modulus and Poisson's ratio as parameters. In the model, a coating was positioned upon the substrate with desired coating thicknesses. In the model, the interface of the coating and glass substrate was assumed a perfect match, sharing element nodes, where no slip and no contact mechanics were needed, i.e. assumed perfectly bonded. The coating was also modeled as a linear elastic material with its own material properties. Further, the coating was modeled with an initial pre-stress, corresponding to residual stress in the coating. The model was 2D symmetric. Thickness of the glass mesh was great enough that modeled flaws were not affected by thickness, such as 300 µm thick.

According to an aspect, the model of the strengthening effect assumes at least one surface flaw overlayed by the coating. Put another way, the glass or glass-ceramic substrate includes at least one site for crack nucleation and propagation into the substrate that is beneath the coating. Along a symmetry plane, a "seam" in the model was representative of a crack or flaw in the glass. One tip of the seam began at the glass/coating interface on this symmetry line the other ending point was the crack tip, buried in the glass material. Width of the model from the symmetry plane to the edge under load was 100 µm, wide enough to not impact stress fields around the crack tip. At the crack tip, the finite element mesh was focused and contour integrals were calculated to find stress intensity factors, when this model was under load. Load was applied as a uniaxial stress load on the opposite edge to the symmetry plane, pulling the material apart in a direction parallel to the interface plane.

As further discussed herein the model aligned with experiments by showing when all else is equal, if crack onset strain (or failure strain) of the coating is greater than failure strain of the substrate, the coating strengthens the substrate assuming a nucleated surface crack is present but has not fully propagated. The relationship may also be described in terms of stress rather than strain, with appropriate modulus conversion factors (see generally FIGS. 18A-18B).

Interestingly, the numerical model indicated that starting strength (failure strength or strain of the uncoated glass), residual stress of the coating, and crack onset strain of the coating are factors influencing whether the coated glass-based assembly has greater strength than the uncoated glass. As per the model, when all else is equal, greater starting strength decreases strengthening from a given coating. Greater crack onset strain of the coating increases the strengthening effect. Increased residual compressive stress in the coating increases the strengthening effect, such as by increasing crack onset strain.

Applicants made non-silicates glasses, as disclosed above, having high refractive indices (e.g., refractive index (n) measured at 589.3 nm wavelength that are greater than (>) 1.6, >1.7, >1.8, and even >1.9), such as by adding large amounts of rare earth metal oxides and other high field-strength oxides for example. Exemplary constituents in such glasses include niobium pentoxide ($Nb_2O_5$; such as >5 wt %, >10 wt %, >15 wt %, >20 wt %; and/or <50 wt %, <40 wt %, <30 wt % niobium pentoxide; such as between 10 and 30 wt %), lanthana ($La_2O_3$; such as >10 wt %, >20 wt %, >25 wt %, >30 wt %; and/or <50 wt %, <45 wt %, <40 wt % lanthana; such as between 20 and 40 wt %), tungsten oxide ($WO_3$; such as >5 wt %, >10 wt %, >15 wt %, >20 wt %; and/or <50 wt %, <40 wt %, <30 wt % tungsten oxide; such as between 10and 30 wt %), where other constituents of the glasses may include titania ($TiO_2$; e.g., greater than 1 wt % and less than 10 wt %) and zirconia ($ZrO_2$; e.g., greater than 1 wt % and less than 10 wt %). Surprisingly, Applicants found boria ($B_2O_3$ such as >5 wt %, >10 wt %, >15 wt %, >20 wt %; and/or <50 wt %, <40 wt %, <30 wt % boria; such as between 10 and 30 wt %) may be added to lower liquidus temperatures and/or improve formability. For example, glass of roughly 13 wt % boria, 4 wt % titania, 5 wt % zirconia, 22 wt % niobium pentoxide, 36 wt % lanthana, 20 wt % tungsten oxide has a refractive index of about 2.0 at 589 nm wavelength, a density of about 5.16 g/cc, and an elastic modulus of 116 GPa. Silica may be added as a network former, replacing rare earth oxides, lowering elastic modulus and refractive index.

Figure 14:
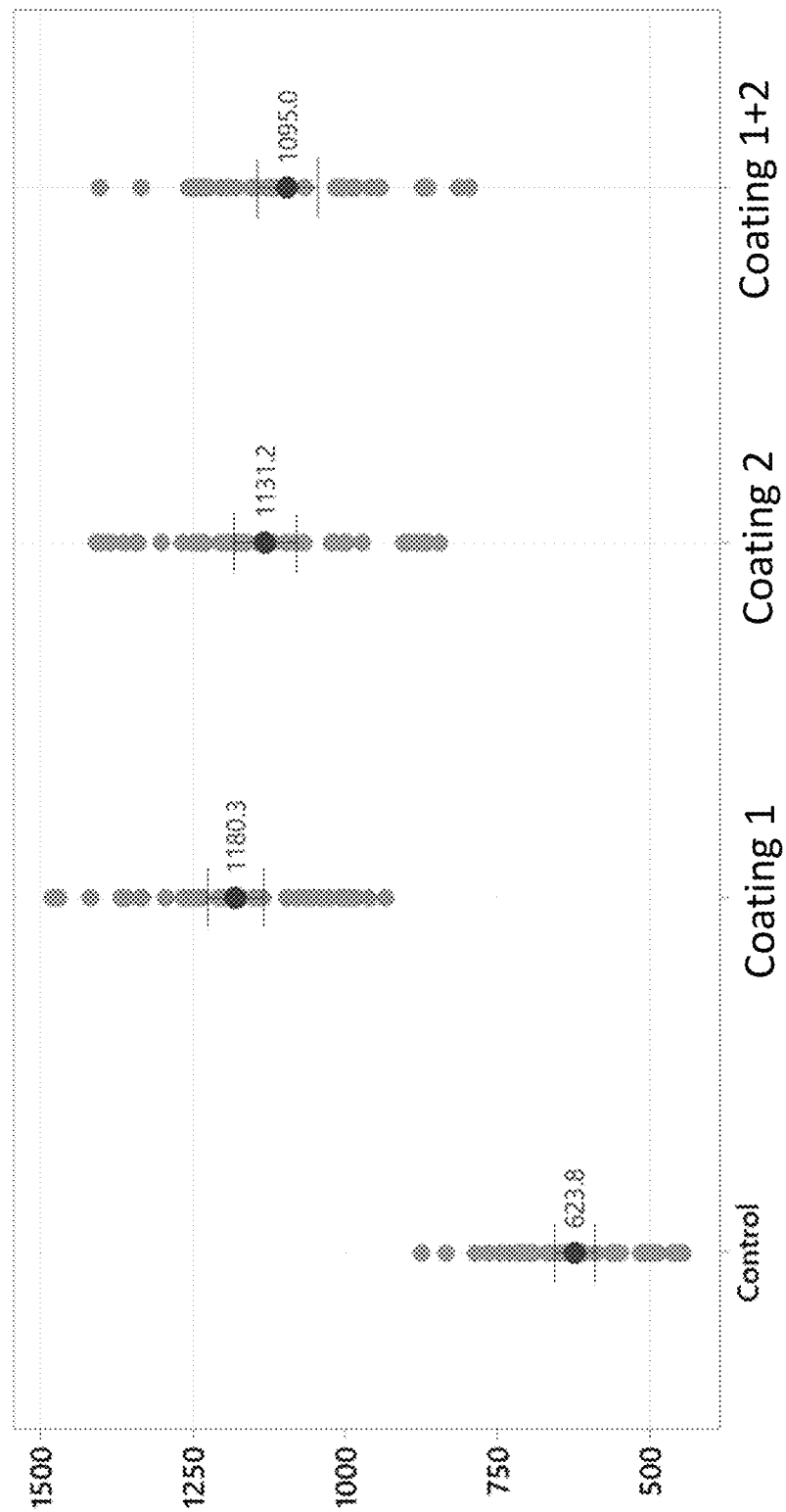
FIG. 14 is an individual value plot of maximum stress with 95% confidence interval for the mean of ring-on-ring (15 mm/30 mm rings) testing of a glass with different coating conditions.

Referring now to FIG. 14, Applicants coated 0.6 mm thick sheets of such 2.0refractive index glass with a stack of thirteen alternating layers containing silica and tantalum oxide including a silica tie-layer ("Coating 1" for the full stack). The total stack was about 650 nm thick and the elastic modulus of the coating was approximately 85 GPa in aggregate. Further, Applicants coated the same glass with five alternating layers of silica nitride and silica having a thickness of about 270 nm ("Coating 2").

After ring-on-ring testing as described above, coated glasses in both articles (i.e. glasses with Coating 1 or with Coating 2) were shown to be significantly stronger than a control group of uncoated glasses. While size-influence in measured strength may not be substantial at thickness of 0.6 mm, for such thin samples Applicants recommend validating and augmenting measured strength values using finite element analysis as described above, accounting for size, assuming validation of the model with empirical measurements. Additionally, Applicants examined the failed substrates using microscopy and found the cracks that led to failure mostly originated in the glass substrates for each coated article, indicating the substrates failed before the coatings.

More specifically FIG. 14 shows an individual value plot of maximum stress in MPa (also called ultimate strength, tensile strength, flexural strength, surface strength, surface tensile strength, stress at failure) grouped by coating type with mean values as determined with a 95% confidence interval resulting from ring-on-ring strength testing, as further described above, with 15 mm and 30 mm rings. As shown, mean maximum stress for the control group of uncoated samples was about 624 MPa, while mean maximum stress of the samples with Coating 1 was about 1180 MPa and for samples with Coating 2 was about 1131 MPa. Put another way, strength of the samples nearly doubled with either coating.

In addition, Applicants also created a third group of coated glass samples, as shown in FIG. 14, where both coatings were applied to samples of the same high-, 2.0 refractive-index glass, Coating 1 overlaying Coating 2. The combined-coatings group had a mean maximum strength significantly greater than that of the control group, about 1095 MPa. But, mean maximum stress for the combined coatings on the glass substrates actually decreased relative to that of either just Coating 1 or just Coating 2.

Applicants replicated the above-described empirical data using the numerical model, which also showed strength increasing, resulting from the coatings constraining small cracks at or near the surface of the glass, when the coating fails at a strain that is greater than failure strain of the glass. The model showed that thickness of the coating was a factor, and that mean strength decreased with increasing coating thickness above a certain minimum thickness. After reviewing the model in conjunction with the empirical experiments, Applicants believe decrease in mean strength is gradual between the minimum thickness (e.g., 20 nm) and about 700 nm for glasses and coatings disclosed herein, after which rate of decrease in strength with increasing coating thickness may be greater.

According to an aspect, coatings as disclosed herein may have a thickness (in aggregate if stacked), where that thickness is present for at least some of the coating, such as most of the coating in terms of area of coated surface, such as at least 60%, at least 70%, at least 80%, at least 90%, over generally full coated area (e.g., >99% coated area), but allowing for reasonable degree of variation or imperfection. According to an aspect, a minimum thickness or lower bound of a range of thicknesses of the coating may be at least 10 nm, such as at least 20 nm, such as at least 50 nm. Further, according to an aspect, a corresponding maximum thickness or upper bound of a range of coating thicknesses may be less than 5 μm, such as less than 2 μm, such as less than 1 μm, such as less than 800 nm. For example, a coating as disclosed herein may have a thickness between 20 nm and 1 μm, such as between 50 nm and 800 nm. With that said, Applicants contemplate other coating thicknesses and ranges may benefit from the present disclosure.

As discussed above, by substituting silica for rare earth oxides, generally lanthana and niobium pentoxide, glasses may have lesser refractive indices than the above 2.0—such as glasses of 1.9, 1.8, and 1.7 refractive indices having respective moduli of elasticity of 119, 116, and 91 GPa. Applicants coated groups of samples of each glass (refractive indices (n) of 1.7, 1.8, 1.9, and 2.0) with the above-described 13-layer coating (Coating 1), alternating silica and tantalum oxide with silica tie layer, and also kept groups of control samples of uncoated substrates for each glass. Furthermore, Applicants similarly kept control samples and coated groups of lower modulus glasses, a first one of roughly 67 mol % silica, 13 mol % alumina, 4 mol % boria, 2 mol % magnesia (MgO), and 14 mol % soda ($Na_2O$) having a modulus of 70 GPa; and a second having roughly 68 mol % silica, 11 mol % alumina, 10 mol % boria, 2 mol % magnesia, and 9 mol % quicklime (CaO) with a modulus of about 75 GPa.

After ring-on-ring testing each group of samples, Applicants found that each group of coated samples was strengthened compared to the uncoated samples, and the amount of strengthening was generally proportional to elastic modulus of the glass. The 2.0 refractive index glasses had uncoated mean maximum stress at 95% confidence interval of 522 MPa and coated mean maximum stress of 1054 MPa. Interestingly, this was a lesser mean maximum stress than that of similar groups in FIG. 14. Without being bound by any theory, difference in strength may be attributed to differences is starting surface quality, where the latter groups may have had deeper average flaw depths, such as due to less polishing, more abrasive forming, rougher handling.

Beyond the glass groups corresponding to 2.0 refractive index, the glasses corresponding to refractive indices of 1.9 and 1.8 had similar moduli of elasticity (again 116 GPa for n=2.0, versus 119 and 116 GPa respectively for n=1.9 and n=1.8) and similar strength increases with the coatings. The group of uncoated 1.9 refractive index glasses had a mean with 95% confidence interval maximum stress of 475 MPa and coated mean maximum stress of 941 MPa. The group of uncoated 1.8 refractive index glasses had a mean with 95% confidence interval maximum stress of 694 MPa and coated mean maximum stress of 1094MPa.

Figure 15:
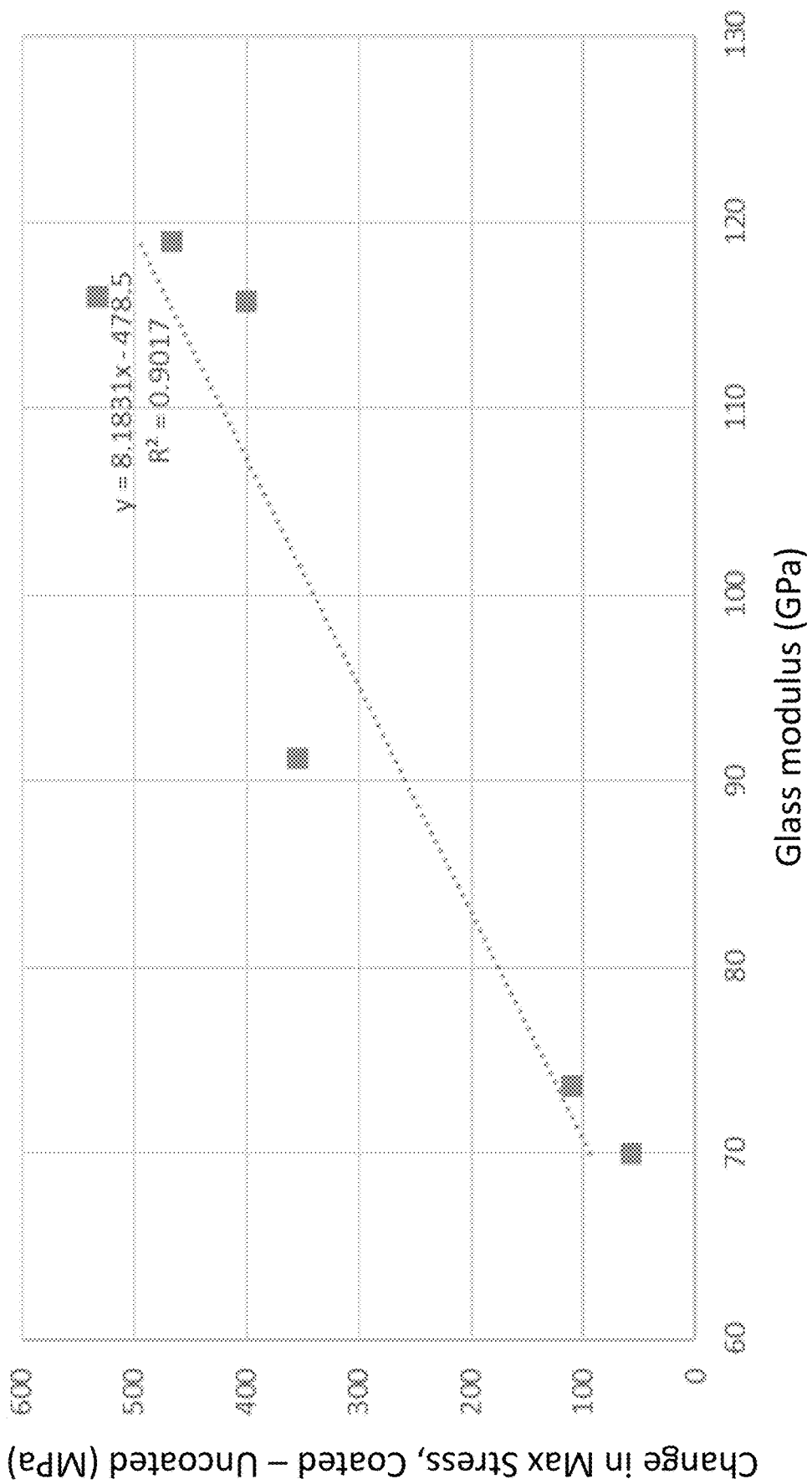
FIG. 15 is a plot of change in maximum stress between coated and uncoated conditions (where coated stress was greater) for glasses having different elastic moduli.

The high-index glass having refractive index of 1.7 and lesser modulus of elasticity (91 GPa) showed an increase from uncoated mean maximum stress of 493 MPa to 847 MPa when coated. This degree of strengthening was still significant, but less than that of the higher-modulus glasses. The other two glasses, corresponding to elastic moduli of 70 and 75 GPa also showed increases in mean maximum stress 475 GPa to 533 GPa for the former and 515 GPa to 626 GPa for the latter. The plot in FIG. 15 shows strengthening effect for glasses of different moduli. As can be seen, increase in strength (i.e. change in mean maximum stress between coated minus uncoated) was shown to be roughly proportional to elastic modulus of the glasses, where greater strengthening corresponds to greater moduli.

While elastic modulus of the glass appears to be a factor influencing the strengthening effect, starting strength of the glass also matters. Referring once more to FIG. 11, glasses similar to the 70 GPa modulus glass, were shown to lose strength when coated, if the glasses were first ion-exchanged, increasing starting strength of those glasses. As further explained above, coatings on such glasses failed before the glasses, which may have focused stress concentrations at the coating-to-glass interfaces, weakening the coated articles.

Without being bound by any theory, Applicants contemplate that ion-exchange chemical tempering may increase the crack onset strain or failure strain of the tempered glass relative to untempered forms of the same glass. Accordingly, under increasing strain, the same coating that may not fail before the glass if untempered, but may fail before the glass if tempered. As a result, a glass may be strengthened by a coating if the glass has a lesser starting strength (i.e. uncoated strength) than the same glass with a greater starting strength. Additionally, while ion-exchange chemical tempering (or other forms of tempering such as thermal tempering) may raise the starting strength of a glass, surface and subsurface flaws may weaken the starting strength of a particular glass.

Applicants also tested four groups of samples of the glass described above with the 2.0 refractive index. The first group included bare, uncoated samples. The second group was also uncoated, but surfaces of the samples in the second group were etched to reduce flaws, such as to dull surface cracks and/or remove surface cracks. The third group included the bare glass of the first group, but coated with the 13 alternating layers of tantalum and silica (Coating 1). The fourth group included etched glass, similar to the second group, but coated with Coating 1.

Figure 16:
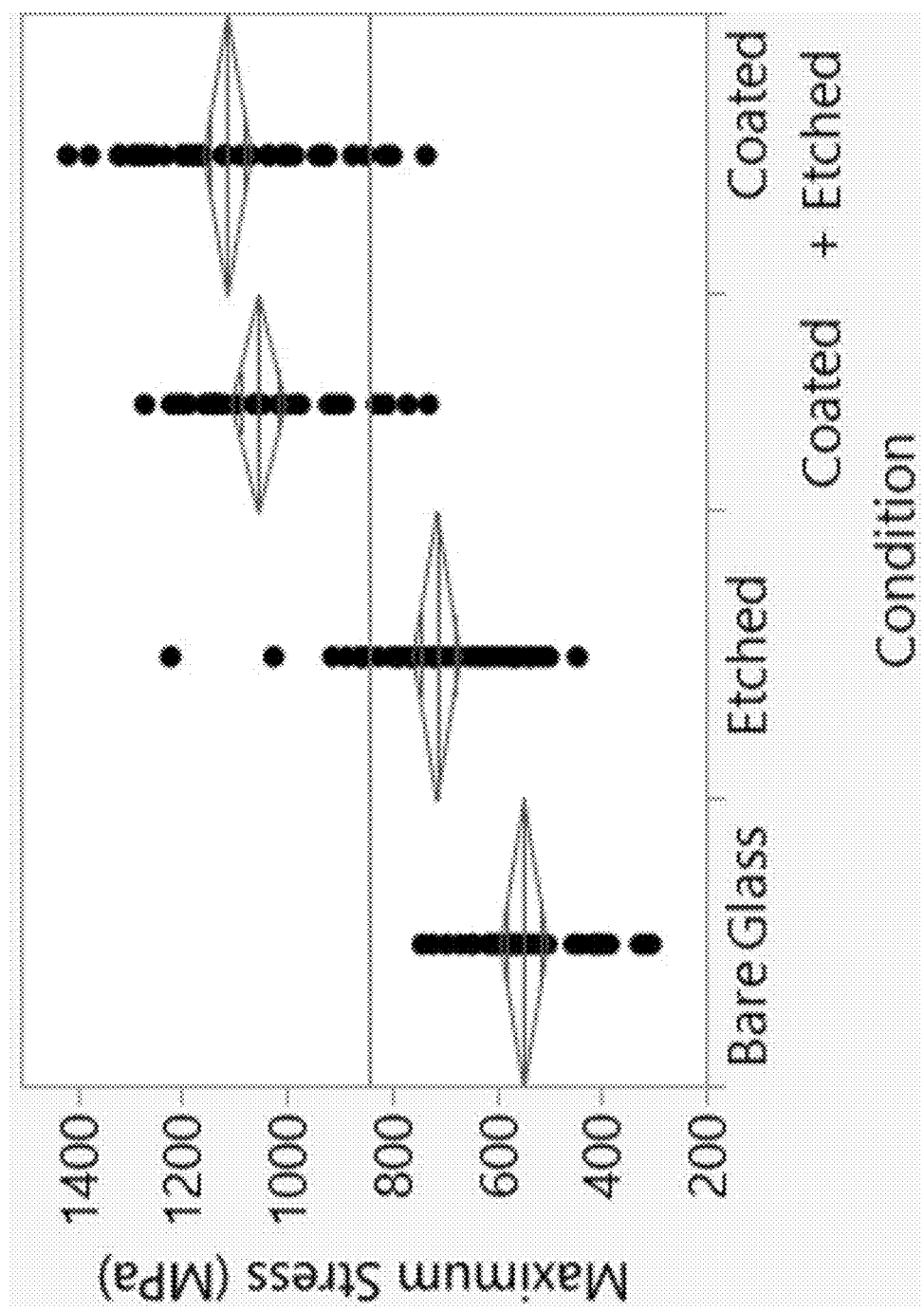
FIG. 16 is a plot facilitating one-way analysis of maximum stress by condition.

As shown in FIG. 16, etching improved the maximum stress of the uncoated glass. Mean maximum strength increased from 547 MPa to 713 MPa. Coating the glass also increased strength of the glass for both the third and fourth groups of samples. The third group had a mean maximum stress of 1054 MPa, and the fourth group had a mean maximum stress of 1113 MPa. As evidenced by this data, all else being equal (accepting a reasonable degree of imperfection and randomness in empirical experiments) starting strength of the glasses influenced the strengthening effect of the coating. Greater starting strength resulted in less strengthening for the same glass and coating.

Applicants further tested influence of starting strength, but by degrading surfaces as opposed to improving surfaces with a different glass—the above-described glass with 70 GPa elastic modulus—and the 13 alternating layers of tantalum and silica (Coating 1). The test included five different conditions of the glass, both coated and uncoated: (1) ion-exchanged, chemically tempered; (2) unwashed, bare glass; (3) washed bare glass; (4) silica-sand abraded; and (5) abraded with sand of fused alumina and zircon (such as ALUNDUM).

Results from ring-on-ring testing with 95% confidence interval for maximum stress showed little difference between unwashed and washed bare samples. Uncoated and unwashed had a mean maximum stress of 475 MPa, while washed and uncoated had mean maximum stress of 472 MPa. Coated versions of both showed a minor increase in strength from washing-unwashed and coated had a mean maximum stress of 533 MPa, while washed and coated was 557 MPa, possibly attributed to improved coating adhesion and better uniformity of the glass to coating interface.

The same glass with and without the same coating, but ion-exchanged and chemically tempered resulted in a large decrease in the mean maximum stress of the coated glass, which aligned with other experiments discussed herein. Mean maximum stress of the uncoated but ion-exchanged glass was 1247 MPa, while the coated ion-exchanged glass was 725 MPa. As previously discussed, this result may be attributed to the coating failing before the glass, and then hastening failure of the glass.

When abraded either with silica sand or fused-silica-and-zircon sand, damage to the surfaces reduced strength of the respective group of samples. The uncoated group abraded by silica sand had a mean maximum stress of 337 MPa, strength down about 150 MPa from either the unwashed or washed samples that were uncoated. Further, the uncoated group abraded by fused alumina and zircon sand had a mean maximum stress of only 177 MPa, corresponding to even greater surface damage.

Coating abraded samples with Coating 1 increased the mean maximum stress of both groups. The coated group of samples where the glass surfaces were first abraded by silica sand had a mean maximum stress of 508 MPa, an increase of about 170 MPa or about a 50% increase in mean maximum stress relative to the uncoated but similarly abraded glass. The coated group of samples where the glass surfaces were first abraded by the fused silica and zircon sand had a mean maximum stress of 418 MPa, an increase of about 240 MPa and corresponding to about a 130% increase in mean maximum stress relative to the similarly abraded but uncoated group.

According to an aspect of the present disclosure, flawed glasses may particularly benefit from the presently disclosed strengthening technology, such as where the glasses include surface flaws, such as nucleated and/or initiated crack(s) that extend into the respective surfaces, either at all or on average a distance such as at least 100 nm into the surfaces, such as at least 200 nm, such as at least 500 nm, such as at least a micrometer, and/or but not fully through the glass, such as less than 100 µm into the glass, such as less than 50 µm, such as less than 10 µm, such as less than 5 µm, such as less than 3 µm. The glasses may have an average flaw depth size range of between 0.5 and 3 µm for example or as otherwise disclosed herein. Such flaws may result from rough handling and/or may be a function of sensitivity of the respective glass to fracture. Surface damage such as small, initiated cracks may be detected indirectly by comparing strength of the glass to that of less-damaged glass, such as etched glass as described above; or may be detectable by spectroscopy, such as if oxidation changing chemistry of the glasses along the crack, for example.

While Coating 1 and Coating 2 include stacks of layers of silica and metal oxides, as further discussed above. Applicants also tested single-layer coatings of different compositions and different thicknesses. More specifically Applicants tested 0.6 mm thick samples of the glass described above having the 2.0 refractive index, uncoated as a control group and then coated with (1) 50 nm of silica (a single layer), (2) 300 nm of silica, (3) 50 nm of titania ($TiO_2$), (4) 300 nm of titania, (5) 50 nm of tantalum pentoxide, and (6) 300 nm of tantalum pentoxide.

Figure 17:
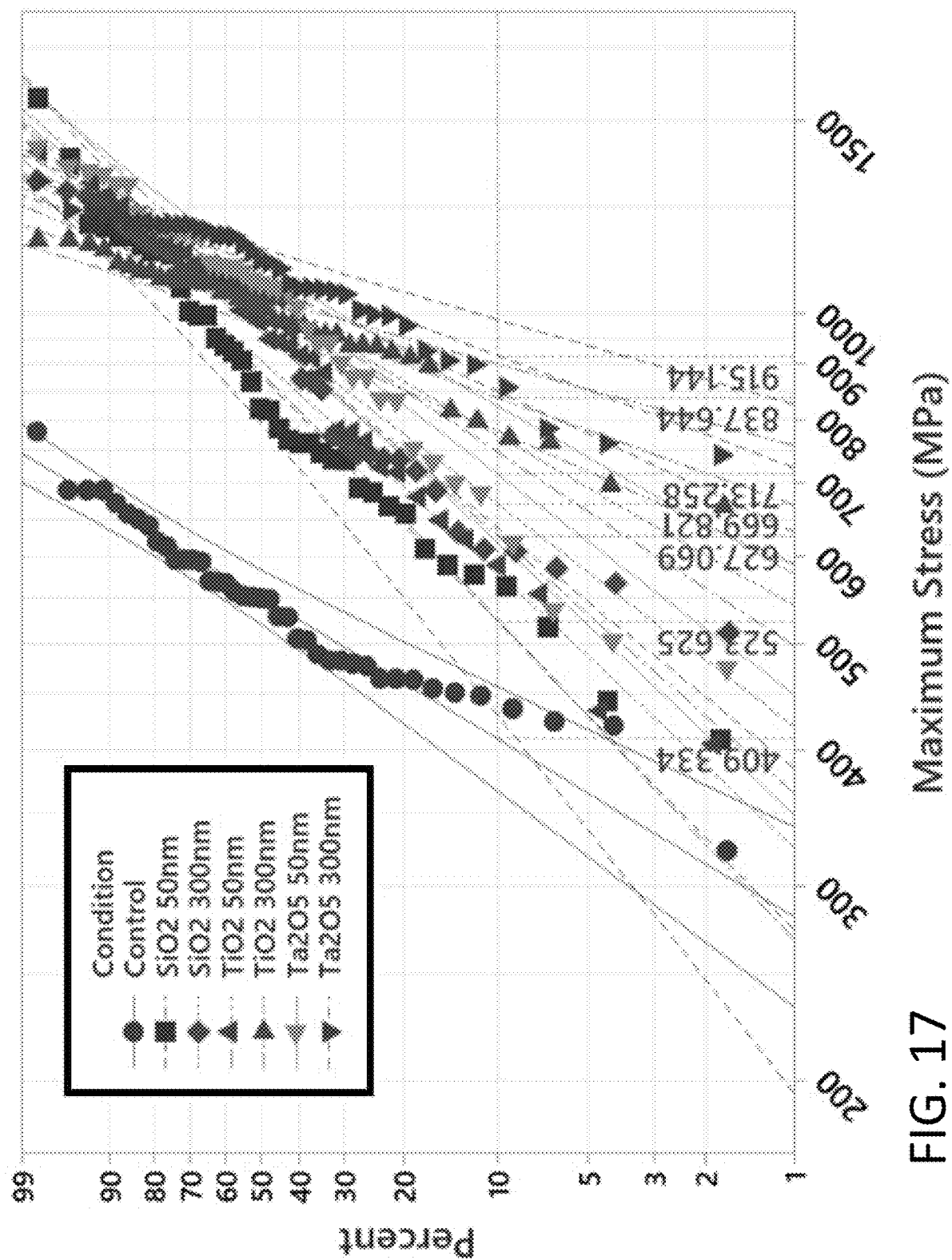
FIG. 17 is a plot of probability of maximum stress, Weibull at 95% confidence interval for ring-on-ring 15 mm/30 mm.

Referring to FIG. 17, after ring-on-ring strength testing as further described herein (with 15 mm and 30 mm rings), the control group had a mean maximum stress of 546 MPa—possibly a function of surface flaws as discussed above. Mean maximum stress of each coated group was significantly greater than that of the uncoated control group. The group coated with 50 nm of silica had a mean maximum stress of 878 MPa with a 95% confidence interval for the mean, and the group with 300 nm of silica was 958 MPa. The group with 50 nm of titania was 955 MPa and the group with 300 nm of titania was 989 MPa. Lastly the group with 50 nm of tantalum pentoxide as the coating had a mean maximum stress of 1017 MPa and the group with 300 nm of tantalum pentoxide was 1088 MPa. Each of the coatings increased strength of the glass by greater than 50% relative to the respective uncoated glass, such as greater than 75%.

Figure 18A:
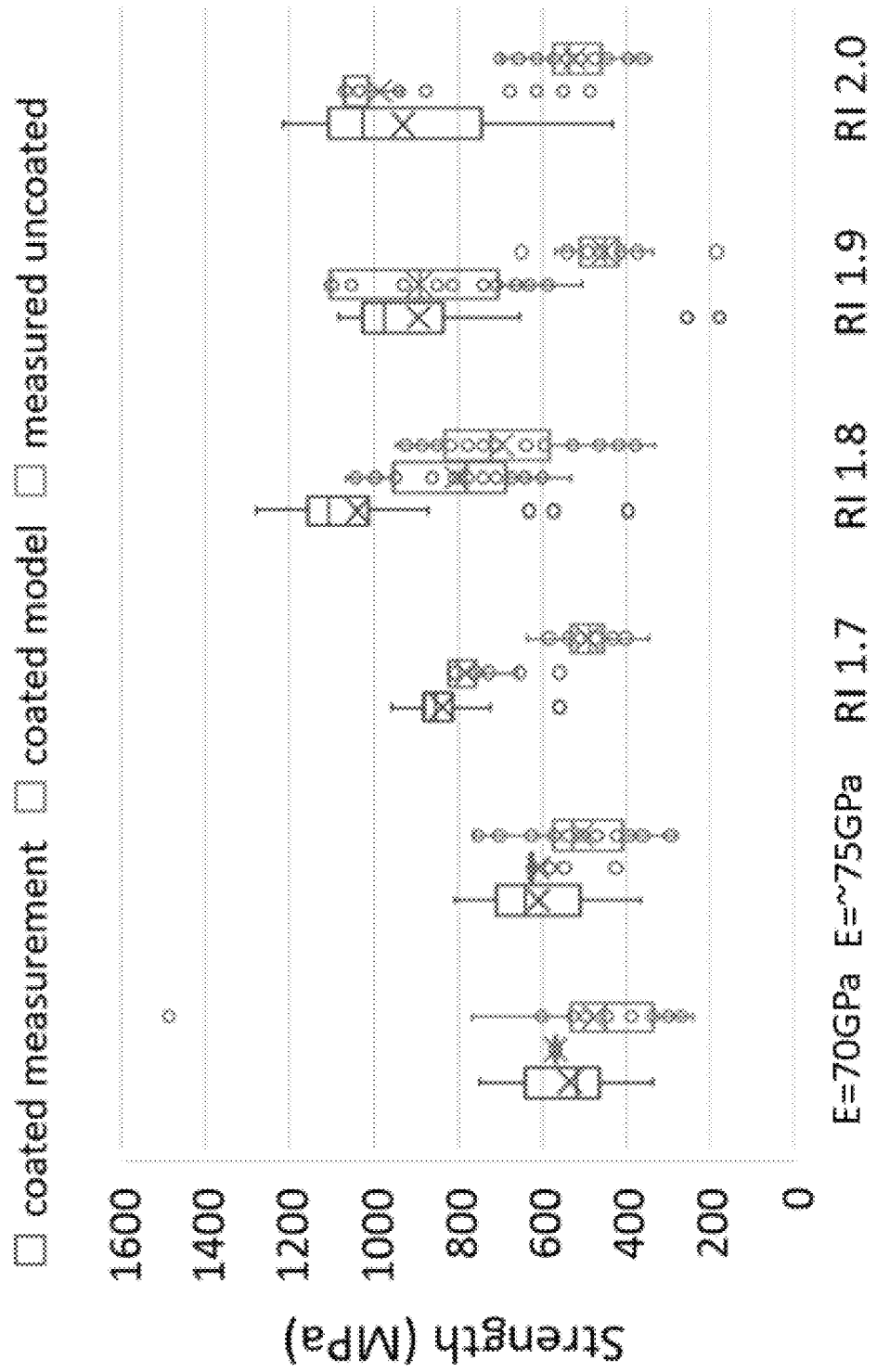
FIGS. 18A and 18B are plots comparing failure stress and failure strain of coated and uncoated groups of samples of different glasses, as well as predicted failure performance of the coated samples by numerical modeling.
Figure 18B:
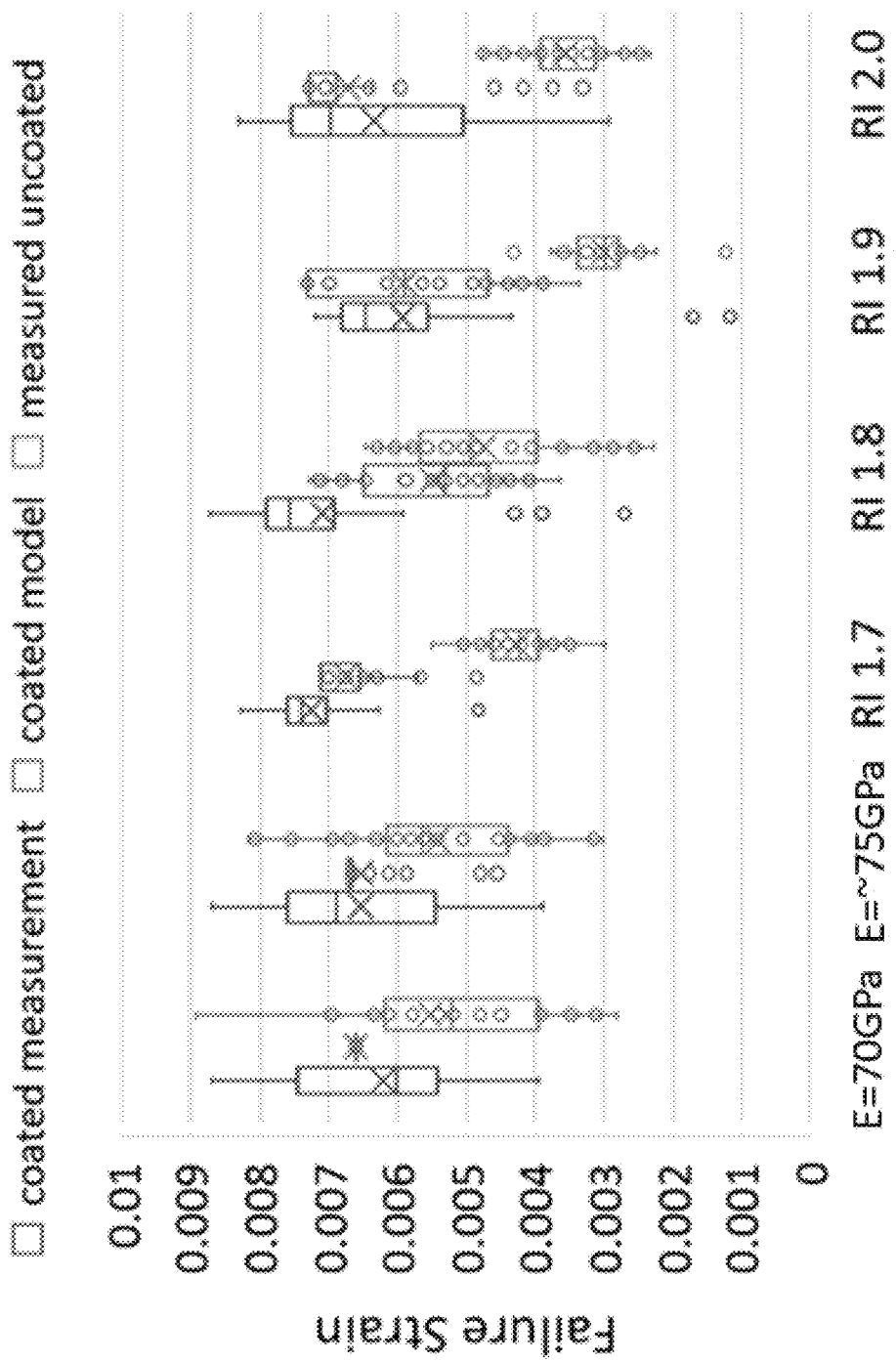

Applicants used same or similar types of glass compositions (e.g., >90 GPa elastic modulus) and coatings (e.g., inorganic, silica and/or metal oxide) in the above-described experiments to facilitate comparison of data and results, and to better understand the underlying mechanics. Based on empirical data as well as theoretical understanding, Applicants developed the above-described finite element model. FIGS. 18A and 18B compare results of the empirical testing discussed above with respect to FIG. 15 with model predictions of the maximum stresses (FIG. 18A) and failure strains (FIG. 18B) for the four high-index glasses and two lower modulus glasses.

In accordance with findings from the experiments and model, Applicants then tested new high-modulus glass of about 46 mol % silica, 31 mol % alumina, 3 mol % magnesia, 16 mol % yttria, and 4 mol % zirconia. The glass has an elastic modulus of 128 GPa. Applicants compared uncoated substrates to those coated with a mix of silica and silicon nitride (i.e. $SiO_xN_y$ coating) having a thickness of 690 nm, including a 25 nm silica tie layer, where the ratio of silica ($SiO_2$) and silicon nitride ($Si_3N_4$) achieved an elastic modulus of 190 GPa. Furthermore the coating was applied to impart a compressive residual stress in the coating of about 500 MPa. Imparting a residual compressive stress to the coating was intended to increase crack onset strain of the coating.

More specifically, coatings were deposited in a reactive sputter coater manufactured by Tecport, the coater having an approximately 4 foot tall (1.22 m), 5 foot (1.52 m) circle diameter main sputtering chamber. Inside the coater there was a four-planet solar system sample mounting structure, where the samples were taped individually to the planets. Deposition was done via 6-inch (0.152 m) planar magnetron direct current reactive sputter assisted via Kaufman & Robinson ion beam source. The coating process was performed at 200° C., heated via heat lamps and controlled via proportional-integral-derivative loop. Pressure of about 2mT (0.267 Pa) was controlled primarily via gas flow in addition to isolating one of two cryogenic pumps used in addition to two turbos for pumping the chamber down under vacuum.

Process conditions were tuned iteratively to arrive at targeted coating modulus and residual stress values. More specifically, for the 190 GPa elastic modulus $SiO_xN_y$ condition, 60 standard cubic centimeters per minute (sccm) of argon was flowed directly to the sputter gun, 0.6 sccm of $O_2$, and 20 sccm of argon was flowed through the ion source, in addition a variable amount of nitrogen was added to the ion source. This was regulated via a controlled proportional-integral-derivative loop to maintain a constant position of the target voltage on hysteresis curve. 2000 W power was applied to the target via pulsed direct current power supply, with pulse duration of 10 microseconds and pulse frequency of 150 KHz. Thickness of the coating was controlled via deposition time only, yielding about 690 nm thickness.

Uncoated samples of the above new high-modulus glass failed at about 645 MPa, while the coated samples failed at about 770 MPa, showing increased strength. While these glasses have an elastic modulus exceeding that of the high-index glasses discussed above but did not achieve such as large strengthening effect, these new high-modulus glasses may have had a significantly greater starting strength.

Applicants likewise coated samples of a glass-ceramic with the same 190 GPa silica/silicon nitride coating. Prior to coating, the glass-ceramic was cerammed from glass having a large amount of silica, roughly 70 mol %, plus a large amount of lithia, roughly 22 mol %, 4 mol % alumina, and smaller amounts of phosphorus pentoxide, soda, and zirconia. Once cerammed, the glass-ceramic included a crystal phase including lithium disilicate and petalite, as well as a residual glass phase. The modulus of elasticity of the glass ceramic was about 105 GPa. After ring-on-ring testing, the uncoated samples had a failure stress of about 550 MPa and the coated samples had a failure stress of about 640 MPa, again showing a benefit but not as significant as the high-index glasses, perhaps due to starting strength.

As such, according to an aspect, strengthening, as disclosed above, may occur with both glass and glass-ceramic. For example, Applicants contemplate strengthening may occur with brittle materials (e.g., elastic modulus >90 GPa, >95 GPa, >100 GPa) such as glasses and glass-ceramics disclosed herein, or other such brittle materials, where the material has an elastic modulus as disclosed herein, an uncoated strength as disclosed herein, and the coating has an elastic modulus as disclosed herein. According to an aspect, numerical modeling based upon empirical testing shows that strengthening as disclosed herein strengthens flawed substrates, those with small, nucleated cracks at or buried near surfaces of the substrates.

According to an aspect, Applicants developed and/or identified additional glasses and types of glasses that may likewise benefit from strengthening via coating as disclosed herein. The glasses have a high elastic modulus. While soda lime glass has a modulus around 70 GPa, Applicants developed and/or identified glasses with moduli over 90 GPa, >95GPa, >100 GPa, >110 GPa, >120 GPa, >125 GPa, and in some instances >130 GPa or even >140 GPa and/or less than 200 GPa for the glasses. With high moduli, greater amount of stress may be applied to the assemblies but the coating may be less strained than with lower moduli glasses, allowing the coatings to hold together and not fail before the glass substrates.

According to an aspect of the present disclosure, Applicants find that high field strength constituents may boost the elastic modulus of corresponding glasses. At least some constituents that may boost the elastic modulus of glasses include rare earth oxides, such as yttria ($Y_2O_3$), lanthana ($La_2O_3$). According to an aspect, glasses benefit from strengthening via coating technology as disclosed herein may comprise greater than 10 mol % rare earth oxides in sum of all rare earth oxide constituents therein (i.e. sum of oxides of Y, Sc, Ce, La, Dy, Pr, Tb, Sm, Nd, Gd, Yb, Eu, Tm, Er, Lu, Ho, and Pm), >15 mol % rare earth oxides, >20 mol % rare earth oxides and/or less than 60 mol %. According to an aspect, glasses benefit from strengthening via coating technology as disclosed herein may comprise greater than 10mol % rare earth oxides individually per oxide, such as >15 mol % rare earth oxides, >20 mol % rare earth oxides and/or less than 60 mol %.

For example, according to an aspect, glasses that may benefit from strengthening via coating technology as disclosed herein may comprise greater than 5 mol % yttria plus lanthana but less than 0.1 mol % of oxides of any other of the rare earth metals such that a sum of the yttria and lanthana is greater than 10 mol % in the glass, and the corresponding glass may have a high elastic modulus. According to an aspect, glasses that may benefit from strengthening via coating technology as disclosed herein may comprise greater than 5 mol % yttria (regardless of other rare earth oxides), >10 mol %, >12 mol %, >14 mol %, >20 mol %, >25 mol %, and/or even greater than 30 mol % yttria among other constituents, such as a silica, alumina, possibly alkaline earth metal oxides, such as magnesia, alkali metal oxides, such as soda ($Na_2O$), potash ($K_2O$), and/or lithia ($Li_2O$).

The following Table 1 includes examples of some such glasses. Such samples are typically about 2000-grams in weight. The glasses may be made using melt-quench methods, where raw batch materials are mixed and heated to melt together in a physical container (e.g., platinum crucible) and from there the molten glass is formed and may then be poured into a mold and cooled in air, and then annealed.

sponds to the temperature at which the viscosity of the glass composition is $1\times10^{13.18}$ poise and "strain point" corresponds to the temperature at which the viscosity of the glass

TABLE 1

| Analyzed (mol %) | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 |
|---|---|---|---|---|---|---|---|---|---|
| $SiO_2$ | 44.25 | 42.93 | 45.42 | 46.11 | 46.09 | 47.08 | 46.5 | 46.24 | 45.8 |
| $Al_2O_3$ | 28.17 | 27.81 | 29.85 | 30.47 | 30.61 | 31.1 | 30.7 | 30.7 | 30.28 |
| $Li_2O$ | 8 | 8.1 | 0 | 0 | 0 | 0 | 0 | 0 | 0 |
| $Na_2O$ | 0 | 0 | 0 | 0 | 0 | 0 | 0 | 0 | 0 |
| MgO | 2.81 | 2.91 | 8.26 | 4.48 | 2.55 | 0.06 | 0.06 | 2.69 | 0.05 |
| CaO | 0 | 0 | 0 | 0 | 0 | 0 | 0 | 0 | 0 |
| $Y_2O_3$ | 14.51 | 14.75 | 16.24 | 16.32 | 16.41 | 16.52 | 16.46 | 16.39 | 16.32 |
| $ZrO_2$ | 0.37 | 0 | 0 | 2.4 | 1.99 | 5.02 | 3.7 | 3.76 | 1.3 |
| $Nb_2O_5$ | 1.69 | 3.28 | 0 | 0 | 2.14 | 0 | 2.39 | 0 | 6.04 |
| $\rho$ (g/cm$^3$) | 3.377 | 3.406 | 3.455 | 3.534 | 3.554 | 3.551 | 3.59 | 3.532 | 3.625 |
| SOC (nm/mm/MPa) | — | 2.075 | 1.894 | 1.921 | 1.99 | 1.961 | 2.004 | 1.903 | |
| E (GPa) | 123 | 122 | 126 | 128 | 127 | 127 | 127 | 128 | 127 |
| G (GPa) | 48.3 | 48.2 | 49.3 | 49.9 | 49.7 | 49.8 | 49.5 | 50 | 49.5 |
| $\nu$ | 0.268 | 0.268 | 0.278 | 0.278 | 0.274 | 0.275 | 0.282 | 0.28 | 0.28 |
| Strain Point (° C.) | 710 | 709 | 809 | 819 | 819 | 840 | 826 | 828 | 812 |
| Anneal Point (° C.) | 747 | 748 | 847 | 856 | 858 | 877 | 863 | 867 | 848 |
| Softening Point (° C.) | 906 | 900 | 1003 | 1011 | 1005 | 1024 | 1011 | 1016 | — |
| CTE (0-300° C.; × 10$^7$) | — | 56 | 50 | 48.3 | 49.6 | 49.6 | — | — | — | where constituents are provided in terms of mol % of representative oxides, $\rho$ is density, SOC is stress optical coefficient, E is elastic modulus (or Young's modulus), G is shear modulus, $\nu$ is Poisson's ratio, and CTE is coefficient of thermal expansion. Density of the glass may be determined using buoyancy method of ASTM C693-93(2013) in units of grams per cubic centimeter (g/cc or g/cm$^3$ as shown). Stress optical coefficient may be measured according to Procedure C (Glass Disc Method) described in ASTM standard C770-16, entitled "Standard Test Method for Measurement of Glass Stress-Optical Coefficient," incorporated by reference. Poisson's ratio, elastic modulus ("Young's modulus"), and shear modulus of the glass may be measured by a resonant ultrasound spectroscopy (RUS) technique of the general type set forth in ASTM E2001-13, titled "Standard Guide for Resonant Ultrasound Spectroscopy for Defect Detection in Both Metallic and Non-metallic Parts" and ASTM C623. The strain point and annealing point temperatures in Celsius (° C.) of the glasses may be determined using beam bending viscosity (BBV) method of ASTM C598-93(2013). The term "annealing point" corresponds is $1\times10^{14.68}$ poise. Coefficient of thermal expansion may be measured in accordance with ASTM E228-85 over the temperature range of 0° C. to 300° C. and expressed in units of ×10$^{-7}$/° C. as an average over the temperature range.

TABLE 2

| Analyzed (mol %) | Ex. 2-1 | Ex. 2-2 | Ex. 2-3 | Ex. 2-4 | Ex. 2-5 | Ex. 2-6 | Ex. 2-7 |
|---|---|---|---|---|---|---|---|
| $SiO_2$ | 41.68 | 43.83 | 43.85 | 50.14 | 50.26 | 51.87 | 41.28 |
| $Al_2O_3$ | 27.72 | 26.81 | 26.67 | 19.72 | 19.77 | 19.7 | 26.69 |
| $B_2O_3$ | — | — | — | 1.78 | 1.53 | 1.77 | — |
| $Li_2O$ | 7.91 | 8.49 | 8.68 | 11.99 | 9.89 | 9.81 | 14.06 |
| $Na_2O$ | 0.07 | 0.08 | 0.09 | 0.07 | 0.06 | 0.07 | — |
| MgO | 6.05 | 5.45 | 4.51 | 0.06 | 0.06 | 0.06 | 2.02 |
| CaO | 0.08 | 0.07 | 0.07 | 2.05 | 2.09 | 2.07 | — |
| $Y_2O_3$ | 16.47 | 15.27 | 16.13 | 14.19 | 16.32 | 14.63 | 15.76 |
| $\rho$ (g/cm$^3$) | 3.424 | 3.373 | 3.392 | 3.256 | 3.355 | 3.262 | — |
| n (at 589.3 nm) | 1.677 | 1.672 | 1.677 | 1.651 | 1.663 | 1.647 | — |
| SOC (nm/mm/MPa) | 1.884 | 1.9 | 1.875 | 2.071 | 1.983 | 2.068 | 1.946 |
| E (GPa) | 126 | 123 | 126 | 113 | 116 | 113 | 122 |
| G (GPa) | 49.6 | 48.6 | 49.6 | 44.6 | 45.9 | 44.6 | 48 |
| $\nu$ | 0.266 | 0.267 | 0.267 | 0.263 | 0.266 | 0.261 | 0.264 |
| Strain Point (° C.) | 705 | 696 | 703 | 673 | 692 | 691 | 676 |
| Anneal Point (° C.) | 743 | 734 | 740 | 710 | 731 | 729 | 712 |
| Softening Point (° C.) | 901 | 888 | 892 | 865 | 865 | 881 | 865 |

In the above Table 2 containing other such glasses that may benefit from the presently disclosed strengthening technology, parameter n corresponds to the refractive index of the glass measured at 589.3 nm wavelength. Refractive index may be measured in accordance with ASTM E1967.

As indicated herein, the coating technology may be useful for strengthening glasses that are not suitable for ion-exchange. However, according to an aspect, while the glasses of Table 2 may likewise benefit from the coating technologies disclosed herein (i.e. where coating crack onset strain, modulus of elasticity, application, consistency, composition, etc. facilitates a strengthening of the coated glass-based article), the glasses of Table 2 are also ion-exchangeable in a salt bath of sodium nitrate (about 70 wt %) and sodium sulfate (about 30 wt %) at a temperature of 600° C., when soaked for an extended length of time (e.g. 9 hours, 25 hours), where the glasses gained weight due to sodium replacing lithium in the glasses near surfaces thereof. A small amount of acid (e.g., salicic or salicylic) in the salt bath (e.g., about 0.25 wt %) may help to limit films on the glass.

Applicants developed and/or identified other glasses that may benefit from the coating technologies disclosed herein that do not include rare earth metal oxides or only include lesser amounts of such, such as less than 5 mol % yttria, but still a positive amount thereof. For example, with large amounts of alkaline earth metal oxides and alumina, and lesser amounts of silica, such as where the amount of alumina may match or exceed the silica, and where both are exceeded (in terms of mol %) by quicklime (CaO), the glasses may have particularly high elastic moduli, as disclosed herein, such as >100 GPa. The following Table 3 includes some such glasses.

TABLE 3

| Analyzed (mol %) | Ex. 3-1 | Ex. 3-2 | Ex. 3-3 | Ex. 3-4 | Ex. 3-5 | Ex. 3-6 | Ex. 3-7 | Ex. 3-8 |
|---|---|---|---|---|---|---|---|---|
| $SiO_2$ | 14.5 | 14.6 | 15.3 | 12.8 | 11.7 | 13.1 | 12.0 | 10.7 |
| $Al_2O_3$ | 30.6 | 31.1 | 30.9 | 24.3 | 26.7 | 20.7 | 22.5 | 24.2 |
| $Na_2O$ | 0.1 | 0.1 | 0.1 | 0.1 | 0.1 | 0.2 | 0.1 | 0.1 |
| MgO | 2.2 | 9.6 | 13.7 | 15.2 | 13.5 | 14.7 | 13.9 | 12.5 |
| CaO | 52.6 | 44.7 | 40.0 | 41.7 | 43.4 | 42.1 | 43.4 | 45.9 |
| $Y_2O_3$ | 0.0 | 0.0 | 0.0 | 1.9 | 1.5 | 3.0 | 2.6 | 2.2 |
| $ZrO_2$ | 0.0 | 0.0 | 0.0 | 1.9 | 1.4 | 3.0 | 2.6 | 2.1 |
| $Nb_2O_5$ | 0.0 | 0.0 | 0.0 | 2.1 | 1.6 | 3.4 | 2.9 | 2.4 |
| n (@589 nm) | 1.648 | 1.644 | 1.642 | — | — | — | — | — |
| G (GPa) | 41.23 | 42.85 | 43.52 | 45.5 | 45.02 | 46.12 | 45.57 | 45.68 |
| E (GPa) | 105.1 | 108.8 | 110.8 | 116.3 | 114.6 | 117.5 | 116.3 | 116.6 |
| v | 0.274 | 0.27 | 0.273 | 0.278 | 0.273 | 0.274 | 0.276 | 0.276 |
| Strain Point (° C.) | 800 | 769 | 752 | 736 | 746 | 728 | 734 | 740 |
| Anneal Point (° C.) | 833 | 804 | 787 | 771 | 783 | 765 | 769 | 778 |
| Softening Point (° C.) | 969 | 942 | 931 | — | — | — | — | — |

Furthermore, similar such glasses, also without much rare earth metal oxide content, may be designed to be strength-enable via ion-exchange, such as by adding a sufficient amount of smaller alkali metal oxides (e.g., $Na_2O$, or possibly $Li_2O$) and ion-exchanging with larger alkali metal oxides (e.g., $K_2O$, or possibly $Na_2O$ for $Li_2O$), such as in a molten salt bath.

TABLE 4

| Analyzed (mol %) | Ex. 4-1 | Ex. 4-2 | Ex. 4-3 | Ex. 4-4 | Ex. 4-5 | Ex. 4-6 | Ex. 4-7 |
|---|---|---|---|---|---|---|---|
| $SiO_2$ | 20.63 | 23.4 | 26.74 | 30.43 | 30.43 | 30.68 | 29.72 |
| $Al_2O_3$ | 29.6 | 27.83 | 25.88 | 23.85 | 24.12 | 24.31 | 23.74 |
| $B_2O_3$ | 0 | 0 | 0 | 0 | 0 | 0 | 0 |
| $Na_2O$ | 10.93 | 11.92 | 12.45 | 12.72 | 13.32 | 9.51 | 9.19 |
| MgO | 4.53 | 6.26 | 8.1 | 9.88 | 8.98 | 8.44 | 13.53 |
| CaO | 34.29 | 30.58 | 26.81 | 23.1 | 23.14 | 27.05 | 23.81 |
| $ZrO_2$ | 0 | 0 | 0 | 0 | 0 | 0 | 0 |
| $K_2O$ | 0.01 | 0.01 | 0.01 | 0.01 | 0.01 | 0.01 | 0.01 |
| ρ (g/cm³) | 2.714 | 2.654 | 2.671 | 2.612 | 2.706 | 2.738 | 2.731 |
| n (@589 nm) | 1.605 | 1.6 | 1.588 | 1.581 | 1.585 | 1.593 | 1.589 |
| G (GPa) | 40.1 | 39.1 | 39.1 | 28.2 | 40.5 | 41.6 | 41.9 |
| E (GPa) | 102.0 | 99.3 | 98.9 | 96.5 | 102.7 | 105.6 | 106.3 |
| v | 0.270 | 0.268 | 0.265 | 0.262 | 0.266 | 0.269 | 0.270 |
| Liquidus Temp (° C.) | 1364 | 1434 | >1450 | >1400 | >1400 | >1400 | >1450 |

| Analyzed (mol %) | Ex. 4-8 | Ex. 4-9 | Ex. 4-10 | Ex. 4-11 | Ex. 4-12 | Ex. 4-13 | Ex. 4-14 |
|---|---|---|---|---|---|---|---|
| $SiO_2$ | 30.39 | 30.89 | 34.29 | 24.3 | 26.05 | 28.75 | 18.12 |
| $Al_2O_3$ | 24.23 | 23.62 | 20.94 | 27.69 | 25.64 | 23.16 | 31.13 |
| $B_2O_3$ | 0 | 0 | 1.06 | 2.02 | 1.11 | 0 | 0 |
| $Na_2O$ | 6.22 | 6.51 | 6.33 | 10.31 | 9.36 | 9.81 | 11.3 |
| MgO | 12.46 | 15.3 | 22.45 | 13.19 | 14.14 | 13.29 | 2.09 |
| CaO | 26.7 | 23.67 | 11.08 | 17.22 | 19.89 | 23.5 | 37.28 |
| $ZrO_2$ | 0 | 0 | 3.09 | 4.05 | 3 | 1.44 | 0 |
| $K_2O$ | 0.01 | 0.01 | 0.75 | 1.2 | 0.79 | 0.03 | 0.06 |
| ρ (g/cm³) | 2.754 | 2.750 | 2.822 | 2.814 | 2.802 | 2.746 | 2.759 |
| n (@589 nm) | 1.6 | 1.597 | 1.597 | 1.604 | 1.604 | 1.597 | 1.609 |
| G (GPa) | 42.5 | 42.8 | 43.7 | 42.8 | 42.9 | 41.4 | 41.4 |
| E (GPa) | 108.1 | 109.0 | 110.7 | 108.1 | 108.5 | 104.9 | 104.9 |
| v | 0.273 | 0.273 | 0.027 | 0.262 | 0.265 | 0.266 | 0.267 |
| Liquidus Temp (° C.) | — | — | >1450 | >1450 | >1450 | >1450 | 1403 |

Information in Table 4 above also includes liquidus temperatures, which may be measured by gradient boat and may likewise include some range of error or tolerance for error, such as +/−5%; see also ASTM C829-81.

At least some glasses in Tables 2 and 4 above include boria ($B_2O_3$). However, those of skill in the art of glass making might expect glasses with boria to have lower elastic moduli due to formation of trigonal boron sites in a glass network. However, with sufficient amounts of yttria and alumina, Applicants discovered glasses that can also have large quantities of boria and retain high elastic moduli. Benefits are large amounts of boria may include lower liquidus temperatures, allowing the glasses to be formed with less heat energy for example. Table 5 below includes examples of some such glasses. Notably each has over 15 mol % boria and an elastic modulus of at least 120 GPa.

pentoxide to help raise the elastic modulus of glasses, possibly due to high field strength. According to an aspect, the glasses comprise at least 0.5 mol % niobium pentoxide, such as at least 1 mol %, at least 2 mol %, at least 3 mol % as shown in Table 1 for example.

According to an aspect, substrates as disclosed herein may comprise zirconia, such as relatively large amounts of zirconia. Applicants find zirconia to help raise the elastic modulus of glasses, possibly due to high field strength. According to an aspect, the glasses comprise at least 0.5 mol % zirconia, such as at least 1 mol %, at least 2 mol %, at least 3 mol % as shown in Tables 1 or 4 for example.

According to an aspect, substrates disclosed herein may comprise alkaline earth metal oxides (RO), such as magnesia and quicklime. According to an aspect, the glasses may comprise at least 2 mol % RO in sum of all alkaline earth

TABLE 5

| Analyzed (mol %) | Ex. 5-1 | Ex. 5-2 | Ex. 5-3 | Ex. 5-4 | Ex. 5-5 | Ex. 5-6 | Ex. 5-7 |
|---|---|---|---|---|---|---|---|
| $SiO_2$ | 31.11 | 31.33 | 26.33 | 21.83 | 26.58 | 29.87 | 28.29 |
| $Al_2O_3$ | 19.26 | 19.26 | 19.29 | 19.49 | 19.38 | 19.74 | 19.53 |
| $B_2O_3$ | 25.41 | 20.32 | 30.12 | 29.42 | 24.85 | 16.42 | 18.32 |
| $Na_2O$ | 0.05 | 0.05 | 0.05 | 0.05 | 0.06 | | |
| $K_2O$ | 0.01 | 0.01 | 0.01 | 0.01 | 0.01 | | |
| MgO | 0.01 | | 0.02 | | 0.01 | 0.10 | 0.09 |
| CaO | 0.04 | 0.04 | 0.04 | 0.04 | 0.04 | 0.04 | 0.04 |
| $Y_2O_3$ | 24.08 | 28.95 | 24.12 | 29.10 | 29.03 | 33.83 | 33.73 |
| $TiO_2$ | | | | | | 0.01 | |
| $Fe_2O_3$ | 0.01 | 0.01 | 0.01 | 0.01 | 0.01 | 0.01 | 0.01 |
| $SO_3$ | | | | 0.02 | | | |
| Cl | 0.02 | 0.02 | 0.02 | 0.03 | 0.03 | | |
| ρ (g/cm³) | 3.575 | 3.812 | 3.551 | 3.757 | 3.784 | 4.023 | 4.008 |
| Strain Point (° C.) | 727 | 749 | 714 | 719 | 733 | 769 | 761 |
| Anneal Point (° C.) | 762 | 784 | 748 | 753 | 767 | 803 | 795 |
| E (GPa) | 120.8 | 128.1 | 120.0 | 126.4 | 127.4 | 132.9 | 132.4 |
| G (GPa) | 47.1 | 49.8 | 46.8 | 49.1 | 49.5 | 51.8 | 51.6 |
| v | 0.283 | 0.287 | 0.283 | 0.288 | 0.287 | 0.283 | 0.282 |

According to an aspect, substrates as disclosed herein, which may benefit from the strengthening technology, comprise silica as a glass network former. According to an aspect, the silica may be a lesser constituent, such that the glass has other constituents with greater mol % of the glass than silica. However, as shown in Table 1, silica may be a primary constituent of the glass and the glass may still have benefit from the presently disclosed strengthening technology, such as where the glass comprises at least 40 mol % silica and/or no more than 70 mol % silica, such as not more than 60 mol %, such as not more than 50 mol %.

According to an aspect, substrates as disclosed herein may comprise alumina, which may increase elastic modulus of the glass. For example, such glasses may have greater than 5 mol % alumina, such as greater than 10 mol %, 15 mol %, 20 mol %, and even 25 mol % as shown in Table 1 for example, and/or no more than 65 mol %, such as no more than 55 mol %, such as no more than 45 mol % alumina. Too much alumina may make the glass hard to form or remain vitreous in manufacturing.

According to an aspect, substrates as disclosed herein may comprise yttria, such as relatively large amounts of yttria. Applicants find yttria to help raise the elastic modulus of glasses, possibly due to high field strength. According to an aspect, the glasses comprise at least 3 mol % yttria, such as at least 5 mol %, at least 10 mol %, at least 12 mol % as shown in Table 1 for example.

According to an aspect, substrates as disclosed herein may comprise niobium pentoxide, such as relatively large amounts of niobium pentoxide. Applicants find niobium metal oxides; or individually, with respect to a single alkaline earth metal oxide, such as either or both of magnesia and quicklime; such as at least 5 mol %, at least 10 mol % at least 20 mol %, at least 30 mol %, at least 50%, for example. Too much RO may make the glass difficult to form, such as greater than 65 mol % for example, thus glasses disclosed herein may have less than that. Alkaline earth metal oxides may raise the elastic modulus of glass and are fairly plentiful, requiring less mining and processing than other constituents such as yttria or lithia for example. As shown in Tables 3-4, Applicants find that glasses with large amounts of RO may have high elastic moduli without much rare earth metal oxides, such as yttria or niobium pentoxide.

As shown in Table 2, glasses that may well benefit from the presently disclosed strengthening technology may include alkali metal oxides ($R_2O$), such as soda ($Na_2O$) and lithia for example. According to an aspect, the glasses may comprise at least 2 mol % $R_2O$ in sum of all alkali metal oxides; or individually, with respect to a single alkali metal oxide, such as any one of soda, lithia, and potassium oxide for example; such as at least 3 mol %, at least 5 mol % at least 10 mol %, at least 15 mol %, at least 20%, for example. Too much $R_2O$ may lower the elastic modulus of the glass to a point below which the glass may benefit less from the presently disclosed technology, such as greater than 35 mol % for example, thus glasses disclosed herein may have less than that. Alkaline metal oxides may enable the glasses to be strengthened via ion-exchange.

According to an aspect, substrates as disclosed herein may comprise boria, which may improve formability and lower energy requirements for manufacturing glasses as disclosed herein, without greatly reducing elastic moduli. For example, such glasses may have greater than 1 mol % boria, such as greater than 2 mol %, greater than 5 mol %, greater than 10 mol %, 15 mol %, 20 mol %, and even 25 mol % as shown in Table 5 for example, and/or no more than 50 mol %, such as no more than 40 mol %, such as no more than 35mol % boria.

According to an aspect, glasses with higher refractive indices may have greater elastic moduli and may be more brittle and/or more sensitive to cracking compared to other glasses. As such, according to an aspect glasses benefitting from the presently disclosed strengthening technology may comprise a refractive index greater than 1.8 at 589 nm, such as greater than 1.9 at 589 nm. With that said, Applicants have developed new high-modulus glasses with lower refractive indices that may benefit from the presently disclosed strengthening technology. According to an aspect, glasses benefitting from the presently disclosed strengthening technology may comprise an elastic modulus greater than 100 GPa and a refractive index less than 1.65 at 589 nm.

One challenge working with glasses disclosed herein, such as those with low amounts of boria but high amounts of yttria and/or high amounts of alkaline earth metal oxides as shown in Tables 1-4 above for example, may be low liquidus viscosity, such as less than 10,000 Poise, less than 5,000 Poise, less than 1,000 Poise, and/or at least 1 centiPoise. To form such glasses (including precursor glasses for glass-ceramics), Applicants have found that "gob-pressing" may be a useful forming technique. To form the glasses as an article (e.g., phone-back, electronics housing), a "gob" of the glass is dropped into a mold and pressed to shape. Gob is in parentheses because the molten glass may be too fluid to form a gob, and instead is poured (much like water) into the mold. Further, Applicants find that such glasses as disclosed herein may quickly devitrify, so heating the mold helps to allow the glass to flow to fill the mold without producing crystals, or without producing subsurface crystals that cannot be polished or otherwise removed during finishing of pressed parts. Applicants have also found that one way to form parts using such glasses more consistently, especially where the parts include three-dimensional shapes that are non-round (e.g., rectangular), is to create vent ports in the mold and slightly overflow the mold with molten glass. With that said, other glasses disclosed herein, such as those with large amounts of boria for example, may be formable with rollers, float, or even fusion-formed via isopipe.

According to an aspect, a glass-based assembly may include (e.g., comprise) a glass substrate comprising a surface, where glass of the glass substrate cracks when stretched beyond a crack-onset strain thereof. According to an aspect, the glass is flawed. More specifically, the glass comprises small, nucleated cracks within 10 µm of the surface of the glass substrate. For example, the cracks may open on one end thereof to the surface. Alternatively, the crack may be, adjoin, or form sub-surface flaws, located (at least a portion thereof) within 10 µm of the surface of the glass substrate. The cracks may be small (e.g., less than 10 µm depth, such as <5 µm, <1 µm, for example), but detectable via laboratory equipment. Such cracks may be detectable by Raman spectroscopy, or upon physical and/or microscopy inspection for example, corresponding to a weakened state of the glass, compared to pristine, unflawed glass, as may be formed via fusion isopipe and/or achieved via polishing or acid etching. According to an aspect, a coating is coupled to the glass substrate, where the coating overlays at least a portion of the surface of the glass substrate. Further, the coating holds together an end of the nucleated cracks closest to the coating (i.e. resists or opposes widening of the crack), thereby mitigating propagation of the nucleated cracks, such as at a given loading or flexure. According to an aspect, stretching of coating to the crack onset strain of the glass does not fracture the coating. Ultimate strength and/or maximum flexural strength of the glass substrate with the coating overlaying and coupled thereto is greater than that of the glass substrate alone, without the coating.

According to an aspect, the glass of the glass substrate may have less than 40 mol % silica, an elastic modulus of the glass greater than 90 GPa, and/or a coating modulus of elasticity that is at least 10 GPa and less than 1.5 times that of the glass. According to an aspect, at zero strain or flexing of the glass-based assembly, stress in the coating is less than 100 MPa in tension, such as where the coating is in compression at zero strain or flexing of the glass-based assembly, such as where the coating has a compressive stress of at least 20 MPa at zero strain or flexing of the glass-based assembly. According to an aspect, the glass of the glass substrate has a primary glass-forming oxide that is not silica, an elastic modulus of the glass greater than about 90 GPa, an elastic modulus of the coating of at least 10 GPa but less than 1.5 times that of the glass.

According to an aspect, the glass of the glass substrate may have greater than 50mol % silica, an elastic modulus of the glass greater than 90 GPa, and/or a coating modulus of elasticity that is at least 10 GPa and less than 1.5 times that of the glass. According to an aspect, at zero strain or flexing of the glass-based assembly, stress in the coating is less than 100 MPa in tension, such as where the coating is in compression at zero strain or flexing of the glass-based assembly, such as where the coating has a compressive stress of at least 20 MPa at zero strain or flexing of the glass-based assembly. According to an aspect, the glass of the glass substrate has a primary glass-forming oxide that is silica, an elastic modulus of the glass greater than about 90 GPa, an elastic modulus of the coating of at least 10 GPa but less than 1.5 times that of the glass.

According to an aspect A-1, a glass-based assembly (e.g., sheet, housing, window, container) includes a glass or glass-ceramic substrate comprising a surface. The glass may be a glass disclosed herein, such as a high-index glass having a refractive index as disclosed herein of at least 1.9 at 589 nm for example, or may be another glass as disclosed herein having a lesser refractive index for example, such as below 1.65 at 589 nm. According to the aspect A-1, the surface comprises flaws (e.g., abrasions, adhesive wear, stress concentrations, small cracks as disclosed herein) such that the substrate is weakened relative to ideal strength thereof. For example, strength of the substrate (or those of the same devices or products) may be etched or polished resulting in improved (i.e. greater) failure stress, such as at least 1% greater, such as at least 5% greater, at least 10% greater, relative to mean maximum stress of a statistically relevant (e.g. >30) population of the same devices or products. Or, where uncoated glasses of the same composition are known to have greater ultimate tensile stress for example. According to the aspect A-1, the assembly further comprises a coating coupled to the substrate and overlaying at least some of the flaws. For example, the coating may be an inorganic coating, such as a metal oxide or a stack of alternating layers of metal oxides. For example, the coating may have a thickness less than 5 micrometers, such as less than 2 micrometers. For example, the coating may have an elastic modulus greater than 50 GPa. According to the aspect A-1, ultimate strength of the substrate with the coating coupled thereto is greater than that of the substrate alone, without the coating.

According to an aspect A-2, the flaws of the aspect A-1 may comprise a crack that extends into the surface at least 50 nm, where the coating overlays the crack. For example, the flaws may include a population of cracks, far more than a single such crack, where the population includes an average flaw depth that is greater than 50 nm, such as greater than 100 nm, such as greater than 250 nm. With that said, the population may have an average flaw depth less than 10 micrometers, for example, such as less than 5 micrometers, less than 3 micrometers, such as less than 2.5 micrometers. Failure strength such as via flexure testing as disclosed herein and modeling of glasses may evidence such a population for example.

According to an aspect A-3, the substrate of aspect A-1 has a modulus of elasticity greater than 90 GPa, such as greater than 95 GPa, such as greater than 100 GPa, such as greater than 110 GPa, such as greater than 120 GPa, and/or such as less than 200 GPa, such as less than 160 GPa. Further the substrate has a refractive index less than 1.65 measured at 589 nm wavelength, such as less than 1.6. With that said, generally speaking, higher elastic modulus glasses disclosed herein have relatively high refractive indices, such as greater than that of soda lime glass, about 1.5 for example. In other aspects, such glass of the A-3 substrate may alternatively have a refractive index greater than 1.8 measured at 589 nm, such as greater than 1.9 for example.

According to an aspect A-4, the glass or glass-ceramic of the substrate of aspect A-3 comprises alumina, such as having greater than 1 mol % alumina, such as greater than 5 mol %, greater than 10 mol %, greater than 15 mol % alumina for example. Alternatively or in addition thereto, the glass or glass-ceramic of the substrate of aspect A-3 comprises yttria, such as greater than 3 mol % yttria, such as greater than 5 mol %, 10 mol %, 15 mol %, 20 mol %, 25 mol %, or even greater than 30% for example. Alternatively or in addition thereto, the glass or glass-ceramic of the substrate of aspect A-3 comprises silica, such as greater than 40 mol % but less than 75 mol %, yet still has an elastic modulus of at least 90 GPa, such as at least 95 GPa, such as at least 100 GPa, such as in part due to addition of high yield strength constituents such as yttria for example in amounts as disclosed.

According to an aspect A-5, the substrate of aspect A-3 comprises glass-ceramic, such as a combination of a glass phase and crystals therein (e.g., nucleated and grown therein; interlocking one another; homogenously disbursed therein; having a linear cross-sectional dimension such as width, height, diameter greater than 1 nm, such as greater than 10 nm, and/or no more than 50 µm, such as less than 10 µm, such as less than 1 µm, such as less than 200 nm).

According to an aspect A-6, the crystals of aspect A-5 comprise lithium disilicate or other crystal structures. According to an aspect, the glass-ceramic may be flaw as described above, such as having a small crack(s) therein, weakening the substrate relative to an ideal strength.

According to an aspect A-6, flexural strength (ultimate tensile strength or maximum mean stress) of the assembly of aspect A-1 is at least 100 MPa greater than that of the glass substrate alone, without the coating. Alternatively or in addition thereto, the same strength of the assembly of aspect A-1 is at least 5% stronger than the glass substrate alone, without the coating, such as at least 10%, at least 20%, at least 50%, at least 75% stronger, for example.

According to an aspect B-1, a glass-based assembly comprises a glass or glass-ceramic substrate comprising a surface. The surface comprises flaws whereby the substrate is weakened relative to ideal strength thereof. The assembly further comprises a coating coupled to the substrate and overlaying at least some of the flaws. According to the aspect, the glass or glass-ceramic substrate has an elastic modulus greater than 90 GPa, such as greater than 95 GPa, such as greater than 100 GPa, such as greater than 110 GPa, such as greater than 120 GPa, and/or such as less than 200 GPa, such as less than 160 GPa.

According to an aspect B-2, the flaws of the aspect B-1 may comprise a crack that extends into the surface at least 50 nm, where the coating overlays the crack. For example, the flaws may include a population of cracks, far more than a single such crack, where the population includes an average flaw depth that is greater than 50 nm, such as greater than 100 nm, such as greater than 250 nm. With that said, the population may have an average flaw depth less than 10 micrometers, for example, such as less than 5 micrometers, less than 3 micrometers, such as less than 2.5 micrometers. Failure strength such as via flexure testing as disclosed herein and modeling of glasses may evidence such a population for example.

According to an aspect B-3, the coating of aspect B-1 or B-2 comprises inorganic material, such as an oxide. Further, according to such an aspect, the coating comprises a thickness of at least 20 nm and less than 500 nm.

According to an aspect B-4, the coating of aspect B-3 comprises a metal oxide and/or a metal nitride. For example, the coating may comprise silica, titania, oxide of tantalum, oxide of niobium, silicon nitrate, or other such materials. Alternatively or in addition thereto, the coating may have an elastic modulus of at least 50 GPa, such as at least 60 GPa. Alternatively or in addition thereto, the coating may have an elastic modulus that is at least 90% that of the substrate (alone), such as greater than the substrate. Alternatively or in addition thereto, the coating may have crack onset strain that is at least 80% of a failure strain of the substrate (alone), such as greater than the failure strain.

According to an aspect B-5, the flaws of aspect B-1 have an average flaw depth in a range of 0.5 to 3 micrometers.

According to an aspect C-1, a glass-based assembly comprises a glass-ceramic, comprising a crystal phase and a glass phase, and a coating overlaying surfaces of the glass-ceramic. The glass ceramic has a modulus of elasticity greater than 90 GPa, and the coating is inorganic and has a crack onset strain that is greater than failure strain of the glass-ceramic without the coating. This crack onset strain and failure strain may be measured for example as a mean value from a statistically relevant population of samples (e.g., 30 samples with and without coating) of the coating and glass-ceramic, such as may be used with a common device or apparatus or from parts used to make such.

According to an aspect C-2, the coating of aspect C-1 comprises a metal oxide. For example, the coating may comprise silica, titania, oxide of tantalum, oxide of niobium. Alternatively or in addition thereto, the coating may have an elastic modulus of at least 50 GPa, such as at least 60 GPa. Alternatively or in addition thereto, the coating may have an elastic modulus that is at least 90% that of the substrate (alone), such as greater than the substrate. Alternatively or in addition thereto, the coating may have crack onset strain that is at least 80% of a failure strain of the substrate (alone), such as greater than the failure strain.

According to an aspect C-3, at least some of the surfaces of the glass ceramic of aspect C-1 comprise a crack overlayed by the coating, wherein the crack has a depth of at least 50 nm but less than 10 μm. The crack may be directly observable, such as via Raman spectroscopy for example at an oxidized crack tip. Alternatively, the crack may be evidenced by weakened strength of the substrate relative to ideal, polished, etched strengths.

According to an aspect D-1, a glass-based assembly comprises a glass or glass-ceramic substrate, where the glass or glass-ceramic substrate if uncoated has a first ultimate strength. The assembly further comprises a coating coupled to the substrate and overlaying at least a portion of surfaces thereof. The coating may comprise an oxide, such as a metal oxide. Ultimate strength of the coated glass or glass-ceramic substrate is a second ultimate strength that is greater than the first ultimate strength.

According to an aspect D-2, glass or glass-ceramic of the substrate of aspect D-1 is weak such that the first ultimate strength is less than 500 MPa, such as less than 400 MPa, such as less than 300 MPa, such as less than 200 MPa.

According to an aspect D-3, the second ultimate strength of either aspect D-1 or D-2 is at least 100 MPa greater than the first ultimate strength, such as at least 200 MPa greater, such as at least 300 MPa greater, such as at least 400 MPa greater. Alternatively or in addition thereto, the second ultimate strength of either aspect D-1 or D-2 is at least 10% greater than the first ultimate strength, such as at least 20%, such as at least 30%, such as at least 40%, such as at least 50% greater than the first ultimate strength.

According to an aspect D-4, the surfaces of the glass or glass-ceramic of any one of aspects D-1, D-2, or D-3 comprise a crack overlayed by the coating, wherein the crack has a depth of at least 50 nm but less than 10 μm. For example, flaws of the glass or glass-ceramic substrate may include a population of cracks, far more than a single such crack, where the population includes an average flaw depth that is greater than 50 nm, such as greater than 100 nm, such as greater than 250 nm. With that said, the population may have an average flaw depth less than 10 micrometers, for example, such as less than 5 micrometers, less than 3 micrometers, such as less than 2.5 micrometers.

According to an aspect D-5, the glass or glass-ceramic substrate of any one of aspects D-1, D-2, D-3, or D-4 is more specifically a glass substrate. Glass of the glass substrate has a refractive index of 1.9 or greater at 589 nm. Alternatively, glass or glass-ceramic substrate of any one of aspects D-1, D-2, D-3, or D-4 is more specifically a glass substrate and has a refractive index less than 1.65 measured at 589 nm wavelength, such as less than 1.6.

According to an aspect D-6, surfaces of the glass substrate of D-5 or the lower refractive index alternative comprises surface flaws. The coating overlays at least some of the surface flaws. The coating has a modulus of elasticity of at least 50 GPa.

According to an aspect E-1, a glass-based assembly comprises a glass or glass-ceramic substrate, where the glass or glass-ceramic substrate if uncoated has a failure strain within a range of 0.3% to 1.5% and where the glass or glass-ceramic substrate comprises a modulus of elasticity (again uncoated) greater than 90 GPa. The assembly further comprises a coating coupled to the glass or glass-ceramic substrate and overlaying at least a portion of surfaces thereof. The coating has a crack onset strain within a range of 0.4% to 1%, wherein the coating comprises a metal oxide.

According to an aspect E-2, the glass or glass-ceramic substrate of aspect E-1 is more specifically a glass substrate. Glass of the glass substrate has a refractive index of 1.9 or greater at 589 nm. Alternatively of the glass substrate has a refractive index less than 1.65 measured at 589 nm wavelength, such as less than 1.6.

According to an aspect E-3, surfaces of the glass or glass-ceramic substrate of aspect E-1 comprise surface flaws. The coating overlays at least some of the surface flaws, and the coating has a modulus of elasticity of at least 50 GPa.

According to an aspect F-1, method, such as a method of making a part, comprises coating a substrate to make a glass-based assembly according to any one of the preceding aspects identified with a letter A to E and number.

According to an aspect G-1, a method of making a glass-based assembly comprises gob-pressing molten glass to form a substrate. The molten glass may be a precursor to a glass ceramic, if subsequently cerammed. The molten glass has a liquidus viscosity of less than 10,000 Poise, such as less than 1000 Poise. The substrate comprises a surface and the surface comprises flaws whereby the substrate is weakened relative to ideal strength thereof. The method further comprises overlaying at least some of the flaws with a coating and coupling the coating to the substrate. Flexural strength or ultimate strength of the substrate with the coating coupled thereto is greater than that of the substrate alone, without the coating.

Construction and arrangements of the compositions, assemblies, and structures, as shown in the various aspects, are illustrative only. Although only a few examples of the aspects have been described in detail in this disclosure, modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, the coating layer 114 may be positioned on both major surfaces 116, 120 of a glass-based substrate and on edges 118, or only one major surface 116 or 120 and on edges 118. The order or sequence of any process, logical algorithm, or method steps may be varied or re-sequenced according to alternative embodiments. Other substitutions, modifications, changes and omissions may also be made in the design, operating conditions and arrangement of the various aspects without departing from the scope of the present inventive technology.

What is claimed is:

1. A glass-based assembly, comprising:
    a glass substrate comprising a surface, wherein the surface comprises a crack that extends into the surface, wherein the crack has a depth of at least 50 nm but less than 10 μm,
    wherein the glass substrate if uncoated has a first flexural strength;
    a coating coupled to the substrate and overlaying at least a portion of surfaces thereof and the crack, wherein the coating comprises a metal oxide,
    wherein the coating has a modulus of elasticity of at least 50 GPa;
    wherein glass of the glass substrate has a crack-onset strain, and wherein stretching of the coating to the crack-onset strain of the glass does not fracture the coating;
    wherein flexural strength of the coated glass substrate is a second flexural strength that is greater than the first flexural strength,
    wherein the first flexural strength is less than 500 MPa, and wherein the second flexural strength is at least 100 MPa greater than the first flexural strength.

2. The glass-based assembly of claim 1, wherein glass of the glass substrate having a refractive index of 1.9 or greater at 589 nm.

3. The glass-based assembly of claim 1, wherein the glass substrate if uncoated has a failure strain within a range of 0.3% to 1.5%, wherein the glass substrate comprises a modulus of elasticity greater than 90 GPa; and wherein the coating has a crack onset strain within a range of 0.4% to 2.0%.

4. A glass-based assembly, comprising:
a glass substrate comprising a surface, wherein the surface comprises a crack that extends into the surface,
wherein the crack has a depth of at least 50 nm but less than 10 μm;
wherein the glass comprises less than 40 mol % silica;
wherein the glass substrate if uncoated has a first flexural strength, and wherein the first flexural strength is less than 500 MPa; and
a coating coupled to the glass substrate and overlaying the crack,
wherein the coating has a thickness between 20 nm and 1 μm;
wherein glass of the glass substrate has a crack-onset strain, and wherein stretching of the coating to the crack-onset strain of the glass does not fracture the coating;
wherein flexural strength of the coated glass substrate is a second flexural strength that is greater than the first flexural strength;
wherein the second flexural strength is at least 100 MPa greater than the first flexural strength.

5. The glass-based assembly of claim 4, wherein crack-onset stress of the coating is greater than 0.25 GPa and less than 3 GPa.

6. The glass-based assembly of claim 5, wherein the crack extends into the surface at least 200 nm and less than 5 μm.

7. The glass-based assembly of claim 5, wherein the substrate has a modulus of elasticity greater than 90 GPa.

8. The glass-based assembly of claim 7, wherein the coating has a compressive stress of at least 20 MPa at zero strain or flexing of the glass-based assembly.

9. The glass-based assembly of claim 7, wherein the glass comprises a refractive index greater than 1.8 at 589 nm.

10. The glass-based assembly of claim 7, wherein the glass has a liquidus viscosity less than 1000 Poise and at least 1 centiPoise.

11. The glass-based assembly of claim 4, wherein the glass substrate comprises a plurality of flaws, including the crack as one of the plurality, and wherein the plurality of flaws has an average flaw depth in a range of 0.5 to 3 micrometers.

12. A glass-based assembly, comprising:
a glass substrate comprising a surface, wherein the surface comprises a crack that extends into the surface, wherein the crack has a depth of at least 50 nm but less than 10 μm,
wherein the glass comprises greater than 5 mol % yttria;
wherein the glass substrate if uncoated has a first flexural strength;
a coating coupled to the substrate and overlaying at least a portion of surfaces thereof and the crack, wherein the coating comprises a metal oxide,
wherein glass of the glass substrate has a crack-onset strain, and wherein stretching of the coating to the crack-onset strain of the glass does not fracture the coating;
wherein flexural strength of the coated glass substrate is a second flexural strength that is greater than the first flexural strength,
wherein the first flexural strength is less than 500 MPa, and
wherein the second flexural strength is at least 100 MPa greater than the first flexural strength.

13. The glass-based assembly of claim 12, wherein glass of the glass substrate having a refractive index of 1.9 or greater at 589 nm.

14. The glass-based assembly of claim 12, wherein the glass substrate if uncoated has a failure strain within a range of 0.3% to 1.5%; and wherein the coating has a crack onset strain within a range of 0.4% to 2.0%.

15. The glass-based assembly of claim 12, wherein the glass substrate comprises a modulus of elasticity greater than 90 GPa.

16. The glass-based assembly of claim 12, wherein the coating has a thickness between 20 nm and 1 μm.

17. The glass-based assembly of claim 12, wherein crack-onset stress of the coating is greater than 0.25 GPa and less than 3 GPa.

18. The glass-based assembly of claim 16, wherein the crack extends into the surface at least 200 nm and less than 5 μm.

19. The glass-based assembly of claim 16, wherein the glass has a liquidus viscosity less than 1000 Poise and at least 1 centiPoise.

20. The glass-based assembly of claim 12, wherein the glass substrate comprises a plurality of flaws, including the crack as one of the plurality, and wherein the plurality of flaws has an average flaw depth in a range of 0.5 to 3 micrometers.

* * * * *